US011650792B2

(12) United States Patent
Pugh et al.

(10) Patent No.: US 11,650,792 B2
(45) Date of Patent: *May 16, 2023

(54) MULTIPLE MODE ARITHMETIC CIRCUIT

(71) Applicant: Achronix Semiconductor Corporation, Santa Clara, CA (US)

(72) Inventors: Daniel Pugh, Los Gatos, CA (US); Raymond Nijssen, San Jose, CA (US); Michael Philip Fitton, Menlo Park, CA (US); Marcel Van der Goot, Pasadena, CA (US)

(73) Assignee: Achronix Semiconductor Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/569,801

(22) Filed: Jan. 6, 2022

(65) Prior Publication Data

US 2022/0129244 A1   Apr. 28, 2022

Related U.S. Application Data

(63) Continuation of application No. 16/535,878, filed on Aug. 8, 2019, now Pat. No. 11,256,476.

(51) Int. Cl.
*G06F 7/487* (2006.01)
*G06F 7/544* (2006.01)
*G06F 7/53* (2006.01)

(52) U.S. Cl.
CPC .......... *G06F 7/4876* (2013.01); *G06F 7/5324* (2013.01); *G06F 7/5443* (2013.01); *G06F 2207/3824* (2013.01)

(58) Field of Classification Search
CPC ................. G06F 7/4876; G06F 7/5324; G06F 2207/3808–3824
See application file for complete search history.

(56) References Cited

U.S. PATENT DOCUMENTS 5,517,611 A    5/1996   Deering
5,682,107 A   10/1997   Tavana et al.
(Continued)

FOREIGN PATENT DOCUMENTS

CN   104969208   10/2015
CN   106168898   11/2016
(Continued)

OTHER PUBLICATIONS

"U.S. Appl. No. 16/940,878, Examiner's Answer dated Jun. 13, 2022", 13 pgs.
(Continued)

*Primary Examiner* — Matthew D Sandifer
(74) *Attorney, Agent, or Firm* — Schwegman Lundberg & Woessner, P.A.

(57) ABSTRACT

A tile of an FPGA includes a multiple mode arithmetic circuit. The multiple mode arithmetic circuit is configured by control signals to operate in an integer mode, a floating-point mode, or both. In some example embodiments, multiple integer modes (e.g., unsigned, two's complement, and sign-magnitude) are selectable, multiple floating-point modes (e.g., 16-bit mantissa and 8-bit sign, 8-bit mantissa and 6-bit sign, and 6-bit mantissa and 6-bit sign) are supported, or any suitable combination thereof. The tile may also fuse a memory circuit with the arithmetic circuits. Connections directly between multiple instances of the tile are also available, allowing multiple tiles to be treated as larger memories or arithmetic circuits. By using these connections, referred to as cascade inputs and outputs, the input and output bandwidth of the arithmetic circuit is further increased.

20 Claims, 20 Drawing Sheets

(56) References Cited

U.S. PATENT DOCUMENTS

| | | | |
|---|---|---|---|
| 5,983,256 A * | 11/1999 | Peleg | G06F 17/10 |
| | | | 712/42 |
| 6,362,650 B1 | 3/2002 | New et al. | |
| 6,573,749 B2 | 6/2003 | New et al. | |
| 6,803,786 B1 | 10/2004 | Bilski et al. | |
| 7,015,719 B1 | 3/2006 | Feng et al. | |
| 7,167,022 B1 | 1/2007 | Schleicher et al. | |
| 7,185,309 B1 | 2/2007 | Kulkarni et al. | |
| 7,840,628 B2 | 11/2010 | Kurd | |
| 8,041,759 B1 | 10/2011 | Langhammer et al. | |
| 8,539,011 B1 | 9/2013 | Taylor | |
| 10,732,932 B2 * | 8/2020 | Pasca | H03K 19/177 |
| 10,790,830 B1 | 9/2020 | Pugh et al. | |
| 10,831,445 B1 * | 11/2020 | Clark | G06F 7/5235 |
| 11,256,476 B2 | 2/2022 | Pugh et al. | |
| 2004/0178818 A1 | 9/2004 | Crotty et al. | |
| 2005/0144210 A1 | 6/2005 | Simkins et al. | |
| 2006/0101244 A1 | 5/2006 | Siu et al. | |
| 2007/0063732 A1 | 3/2007 | Kaptanoglu et al. | |
| 2008/0042687 A1 | 2/2008 | Mori et al. | |
| 2009/0243652 A1 | 10/2009 | Dorairaj et al. | |
| 2014/0188968 A1 * | 7/2014 | Kaul | G06F 7/5443 |
| | | | 708/501 |
| 2015/0169289 A1 * | 6/2015 | Tannenbaum | G06F 7/4876 |
| | | | 708/503 |
| 2015/0199173 A1 | 7/2015 | Lutz et al. | |
| 2016/0124710 A1 | 5/2016 | Lutz et al. | |
| 2016/0211862 A1 | 7/2016 | Ho et al. | |
| 2016/0322084 A1 | 11/2016 | Wang et al. | |
| 2019/0340489 A1 | 11/2019 | Mills | |
| 2020/0373925 A1 | 11/2020 | Pugh et al. | |
| 2021/0042087 A1 | 2/2021 | Pugh et al. | |
| 2021/0263993 A1 * | 8/2021 | Urbanski | G06F 7/523 |

FOREIGN PATENT DOCUMENTS

| | | |
|---|---|---|
| CN | 107168678 | 9/2017 |
| CN | 108255777 | 7/2018 |
| CN | 108459840 | 8/2018 |
| CN | 114128148 | 3/2022 |
| CN | 114402289 | 4/2022 |
| WO | WO-2020067908 A1 | 4/2020 |
| WO | WO-2020236252 A1 | 11/2020 |
| WO | WO-2021025871 A1 | 2/2021 |

OTHER PUBLICATIONS

"European Application Serial No. 20809410.2, Extended European Search Report dated May 16, 2022", 9 pgs.

"Chinese Application Serial No. 202080052416.1, Office Action dated Jun. 27, 2022", W English Translation, 18 pgs.

"U.S. Appl. No. 16/417,152, Non Final Office Action dated Feb. 5, 2020", 7 pgs.

"U.S. Appl. No. 16/417,152, Notice of Allowance dated May 13, 2020", 6 pgs.

"U.S. Appl. No. 16/535,878, Non Final Office Action dated Aug. 4, 2021", 18 pgs.

"U.S. Appl. No. 16/535,878, Notice of Allowance dated Oct. 4, 2021", 10 pgs.

"U.S. Appl. No. 16/535,878, Response filed Sep. 16, 2021 to Non Final Office Action dated Aug. 4, 2021", 12 pgs.

"U.S. Appl. No. 16/940,878, Final Office Action dated Oct. 29, 2021", 12 pgs.

"U.S. Appl. No. 16/940,878, Non Final Office Action dated Jul. 12, 2021", 10 pgs.

"U.S. Appl. No. 16/940,878, Pre-Appeal Brief Request for Review filed Dec. 15, 2021", 4 pgs.

"U.S. Appl. No. 16/940,878, Response filed Sep. 21, 21 to Non Final Office Action dated Jul. 12, 2021", 10 pgs.

"International Application Serial No. PCT/US2020/023796, International Preliminary Report on Patentability dated Dec. 2, 2021", 6 pgs.

"International Application Serial No. PCT/US2020/023796, International Search Report dated Apr. 14, 2020", 2 pgs.

"International Application Serial No. PCT/US2020/023796, Written Opinion dated Apr. 14, 2020", 4 pgs.

"International Application Serial No. PCT/US2020/043413, International Search Report dated Oct. 30, 2020", 2 pgs.

"International Application Serial No. PCT/US2020/043413, Written Opinion dated Oct. 30, 2020", 5 pgs.

Thapliyal, H, et al., "Combined Integer and Floating Point Multiplication Architecture(CIFM) for FPGAs and Its Reversible Logic Implementation", 49th IEEE International Midwest Symposium on Circuits and Systems, (2006), 438-442.

"U.S. Appl. No. 16/940,878, Appeal Brief filed Feb. 28, 2022", 19 pgs.

"U.S. Appl. No. 16/535,878, Corrected Notice of Allowability dated Jan. 21, 2022", 2 pgs.

"U.S. Appl. No. 16/940,878, Decision on Pre-Appeal Brief Request for Review mailed Jan. 28, 2022", 2 pgs.

"International Application Serial No. PCT/US2020/043413, International Preliminary Report on Patentability dated Feb. 17, 2022", 7 pgs.

"Chinese Application Serial No. 202080064242.0, Voluntary Amendment filed Aug. 17, 2022", w English claims, 19 pgs.

"European Application Serial No. 20849068.0, Extended European Search Report dated Sep. 9, 2022", 10 pgs.

"Chinese Application Serial No. 202080052416.1, Response filed Sep. 30, 22 to Office Action dated Jun. 27, 2022", w English claims, 17 pgs.

"Chinese Application Serial No. 202080064242.0, Office Action dated Sep. 27, 2022", w English Translation, 14 pgs.

U.S. Appl. No. 16/417,152 U.S. Pat. No. 10,790,830, filed May 20, 2019, Fused Memory and Arithmetic Circuit.

U.S. Appl. No. 16/940,878, filed Jul. 28, 2020, Fused Memory and Arithmetic Circuit.

"European Application Serial No. 20849068.0, Response filed Feb. 20, 2023 to Extended European Search Report dated Sep. 9, 2022", 16 pgs.

* cited by examiner

| OPERAND TYPES | MODEA | REG0A[7:0] | REG1A[7:0] | REG2A[7:0] | REG3A[7:0] |
|---|---|---|---|---|---|
| INT8 | 00000 | DIN[7:0] | DIN[15:8] | DIN[23:16] | DIN[31:24] |
| INT8 | 00001 | DIN[7:0] | DIN[15:8] | DIN[23:16] | DIN[31:24] |
| INT8 | 00010 | DIN[7:0] | DIN[15:8] | DIN[23:16] | DIN[31:24] |
| BFP8 | 00011 | DIN[7:0] | DIN[15:8] | DIN[23:16] | |
| BFP8_EXPB | 00100 | DIN[7:0] | DIN[15:8] | DIN[23:16] | DIN[31:24] |
| BFP8 | 00101 | DIN[7:0] | DIN[15:8] | DIN[23:16] | DIN[31:24] |
| BFP8 | 00110 | DIN[7:0] | DIN[15:8] | DIN[23:16] | DIN[31:24] |
| INT7 | 00111 | DIN[6:0] | DIN[13:7] | DIN[20:14] | DIN[27:21] |
| INT7 | 01000 | DIN[6:0] | DIN[13:7] | DIN[20:14] | DIN[27:21] |
| BFP7 | 01001 | DIN[6:0] | DIN[13:7] | DIN[20:14] | DIN[27:21] |
| INT6 | 01010 | DIN[5:0] | DIN[11:6] | DIN[17:12] | DIN[23:18] |
| INT6 | 01011 | DIN[5:0] | DIN[11:6] | DIN[17:12] | DIN[23:18] |
| INT6 | 01100 | DIN[5:0] | DIN[11:6] | DIN[17:12] | DIN[23:18] |
| BFP6 | 01101 | DIN[5:0] | DIN[11:6] | DIN[17:12] | DIN[23:18] |
| BFP6_EXPB | 01110 | DIN[5:0] | DIN[11:6] | DIN[17:12] | DIN[23:18] |
| BFP6 | 01111 | DIN[5:0] | DIN[11:6] | DIN[17:12] | DIN[23:18] |
| BFP6 | 10000 | DIN[5:0] | DIN[11:6] | DIN[17:12] | DIN[23:18] |
| INT16 | 10001 | DIN[7:0] | DIN[15:8] | DIN[7:0] | DIN[15:8] |
| INT16 | 10010 | DIN[7:0] | DIN[15:8] | DIN[7:0] | DIN[15:8] |
| BFLOAT16 | 10011 | 8'B0 | {1'B1,DIN[6:0]} | 8'B0 | {1'B1,DIN[6:0]} |
| BFLOAT16 | 10100 | 8'B0 | {1'B1,DIN[6:0]} | 8'B0 | {1'B1,DIN[6:0]} |
| BFLOAT16 | 10101 | 8'B0 | {1'B1,DIN[6:0]} | 8'B0 | {1'B1,DIN[6:0]} |
| FLOAT16 | 10110 | {DIN[2:0],5'B0} | {1'B1,DIN[9:3]} | {DIN[2:0],5'B0} | {1'B1,DIN[9:3]} |
| FLOAT16 | 10111 | {DIN[2:0],5'B0} | {1'B1,DIN[9:3]} | {DIN[2:0],5'B0} | {1'B1,DIN[9:3]} |
| FLOAT16 | 11000 | {DIN[2:0],5'B0} | {1'B1,DIN[9:3]} | {DIN[2:0],5'B0} | {1'B1,DIN[9:3]} |
| FLOAT24 | 11001 | DIN[7:0] | {1'B1,DIN[14:8]} | DIN[7:0] | {1'B1,DIN[14:8]} |
| FLOAT24 | 11010 | DIN[7:0] | {1'B1,DIN[14:8]} | DIN[7:0] | {1'B1,DIN[14:8]} |

FIG. 9

| OPERAND TYPES | MODEA | REG4A[7:0] | REG5A[7:0] | REG6A[7:0] | REG7A[7:0] |
|---|---|---|---|---|---|
| INT8 | 00000 | | | | |
| INT8 | 00001 | DIN[39:32] | DIN[47:40] | DIN[55:48] | DIN[63:56] |
| INT8 | 00010 | DIN[39:32] | DIN[47:40] | DIN[55:48] | DIN[63:56] |
| BFP8 | 00011 | | | | |
| BFP8_EXPB | 00100 | | | | |
| BFP8 | 00101 | DIN[39:32] | DIN[47:40] | DIN[55:48] | DIN[63:56] |
| BFP8 | 00110 | DIN[39:32] | DIN[47:40] | DIN[55:48] | DIN[63:56] |
| INT7 | 00111 | DIN[34:28] | DIN[41:35] | DIN[48:42] | DIN[55:49] |
| INT7 | 01000 | DIN[34:28] | DIN[41:35] | DIN[48:42] | DIN[55:49] |
| BFP7 | 01001 | | | | |
| INT6 | 01010 | DIN[29:24] | DIN[35:30] | DIN[41:36] | DIN[47:42] |
| INT6 | 01011 | DIN[29:24] | DIN[35:30] | DIN[41:36] | DIN[47:42] |
| INT6 | 01100 | DIN[29:24] | DIN[35:30] | DIN[41:36] | DIN[47:42] |
| BFP6 | 01101 | | | | |
| BFP6_EXPB | 01110 | | | | |
| BFP6 | 01111 | DIN[29:24] | DIN[35:30] | DIN[41:36] | DIN[47:42] |
| BFP6 | 10000 | DIN[29:24] | DIN[35:30] | DIN[41:36] | DIN[47:42] |
| INT16 | 10001 | | | | |
| INT16 | 10010 | | | | |
| BFLOAT16 | 10011 | | | | |
| BFLOAT16 | 10100 | | | | |
| BFLOAT16 | 10101 | | | | |
| FLOAT16 | 10110 | | | | |
| FLOAT16 | 10111 | | | | |
| FLOAT16 | 11000 | | | | |
| FLOAT24 | 11001 | | | | |
| FLOAT24 | 11010 | | | | |

FIG. 10

| OPERAND TYPES | MODEA | REG8A[7:0] | REG9A[7:0] | REG10A[7:0] | REG11A[7:0] |
|---|---|---|---|---|---|
| INT8 | 00000 | | | | |
| INT8 | 00001 | | | | |
| INT8 | 00010 | DIN[7:0] | DIN[15:8] | DIN[23:16] | DIN[31:24] |
| BFP8 | 00011 | | | | |
| BFP8_EXPB | 00100 | | | | |
| BFP8 | 00101 | | | | |
| BFP8 | 00110 | DIN[7:0] | DIN[15:8] | DIN[23:16] | DIN[31:24] |
| INT7 | 00111 | | | | |
| INT7 | 01000 | DIN[62:56] | DIN[69:63] | | |
| BFP7 | 01001 | | | | |
| INT6 | 01010 | | | | |
| INT6 | 01011 | DIN[53:48] | DIN[59:54] | DIN[65:60] | DIN[71:66] |
| INT6 | 01100 | DIN[5:0] | DIN[11:6] | DIN[17:12] | DIN[23:18] |
| BFP6 | 01101 | | | | |
| BFP6_EXPB | 01110 | | | | |
| BFP6 | 01111 | DIN[53:48] | DIN[59:54] | | |
| BFP6 | 10000 | DIN[5:0] | DIN[11:6] | DIN[17:12] | DIN[23:18] |
| INT16 | 10001 | DIN[39:32] | DIN[47:40] | DIN[39:32] | DIN[47:40] |
| INT16 | 10010 | DIN[23:16] | DIN[31:24] | DIN[23:16] | DIN[31:24] |
| BFLOAT16 | 10011 | 8'B0 | {1'B1,DIN[38:32]} | 8'B0 | {1'B1,DIN[38:32]} |
| BFLOAT16 | 10100 | 8'B0 | {1'B1,DIN[38:32]} | 8'B0 | {1'B1,DIN[38:32]} |
| BFLOAT16 | 10101 | 8'B0 | {1'B1,DIN[22:16]} | 8'B0 | {1'B1,DIN[22:16]} |
| FLOAT16 | 10110 | {DIN[34:32],5'B0} | {1'B1,DIN[41:35]} | {DIN[34:32],5'B0} | {1'B1,DIN[41:35]} |
| FLOAT16 | 10111 | {DIN[34:32],5'B0} | {1'B1,DIN[41:35]} | {DIN[34:32],5'B0} | {1'B1,DIN[41:35]} |
| FLOAT16 | 11000 | {DIN[18:16],5'B0} | {1'B1,DIN[25:19]} | {DIN[18:16],5'B0} | {1'B1,DIN[25:19]} |
| FLOAT24 | 11001 | DIN[55:48] | {1'B1,DIN[62:56]} | DIN[55:48] | {1'B1,DIN[62:56]} |
| FLOAT24 | 11010 | DIN[7:0] | {1'B1,DIN[14:8]} | DIN[7:0] | {1'B1,DIN[14:8]} |

*FIG. 11*

| OPERAND TYPES | MODEA | REG12A[7:0] | REG13A[7:0] | REG14A[7:0] | REG15A[7:0] |
|---|---|---|---|---|---|
| INT8 | 00000 | | | | |
| INT8 | 00001 | | | | |
| INT8 | 00010 | DIN[39:32] | DIN[47:40] | DIN[55:48] | DIN[63:56] |
| BFP8 | 00011 | | | | |
| BFP8_EXPB | 00100 | | | | |
| BFP8 | 00101 | | | | |
| BFP8 | 00110 | DIN[39:32] | DIN[47:40] | DIN[55:48] | DIN[63:56] |
| INT7 | 00111 | | | | |
| INT7 | 01000 | | | | |
| BFP7 | 01001 | | | | |
| INT6 | 01010 | | | | |
| INT6 | 01011 | | | | |
| INT6 | 01100 | DIN[29:24] | DIN[35:30] | DIN[41:36] | DIN[47:42] |
| BFP6 | 01101 | | | | |
| BFP6_EXPB | 01110 | | | | |
| BFP6 | 01111 | | | | |
| BFP6 | 10000 | DIN[29:24] | DIN[35:30] | DIN[41:36] | DIN[47:42] |
| INT16 | 10001 | | | | |
| INT16 | 10010 | | | | |
| BFLOAT16 | 10011 | | | | |
| BFLOAT16 | 10100 | | | | |
| BFLOAT16 | 10101 | | | | |
| FLOAT16 | 10110 | | | | |
| FLOAT16 | 10111 | | | | |
| FLOAT16 | 11000 | | | | |
| FLOAT24 | 11001 | | | | |
| FLOAT24 | 11010 | | | | |

*FIG. 12*

| OPERAND TYPES | MODEB | REG0B[7:0] | REG1B[7:0] | REG2B[7:0] | REG3B[7:0] |
|---|---|---|---|---|---|
| INT8 | 00000 | DIN[39:32] | DIN[47:40] | DIN[55:48] | DIN[63:56] |
| INT8 | 00001 | DIN[7:0] | DIN[15:8] | DIN[23:16] | DIN[31:24] |
| INT8 | 00010 | DIN[7:0] | DIN[15:8] | DIN[23:16] | DIN[31:24] |
| BFP8 | 00011 | DIN[39:32] | DIN[47:40] | DIN[55:48] | |
| BFP8_EXPB | 00100 | | | | |
| BFP8 | 00101 | DIN[39:32] | DIN[47:40] | DIN[55:48] | DIN[63:56] |
| BFP8 | 00110 | DIN[7:0] | DIN[15:8] | DIN[23:16] | DIN[31:24] |
| BFP8 | 00111 | DIN[7:0] | DIN[15:8] | DIN[23:16] | DIN[31:24] |
| INT7 | 01000 | DIN[41:35] | DIN[48:42] | DIN[55:49] | DIN[62:56] |
| INT7 | 01001 | DIN[6:0] | DIN[13:7] | DIN[20:14] | DIN[27:21] |
| BFP7 | 01010 | DIN[34:28] | DIN[41:35] | DIN[48:42] | DIN[55:49] |
| INT6 | 01011 | DIN[41:36] | DIN[47:42] | DIN[53:48] | DIN[59:54] |
| INT6 | 01100 | DIN[5:0] | DIN[11:6] | DIN[17:12] | DIN[23:18] |
| INT6 | 01101 | DIN[5:0] | DIN[11:6] | DIN[17:12] | DIN[23:18] |
| BFP6 | 01110 | DIN[35:30] | DIN[41:36] | DIN[47:42] | DIN[53:48] |
| BFP6_EXPB | 01111 | | | | |
| BFP6 | 10000 | DIN[5:0] | DIN[11:6] | DIN[17:12] | DIN[23:18] |
| BFP6 | 10001 | DIN[5:0] | DIN[11:6] | DIN[17:12] | DIN[23:18] |
| INT16 | 10010 | DIN[23:16] | DIN[31:24] | DIN[31:24] | DIN[23:16] |
| INT16 | 10011 | DIN[7:0] | DIN[15:8] | DIN[15:8] | DIN[7:0] |
| BFLOAT16 | 10100 | 8'B0 | {1'B1,DIN[22:16]} | {1'B1,DIN[22:16]} | 8'B0 |
| BFLOAT16 | 10101 | 8'B0 | {1'B1,DIN[22:16]} | {1'B1,DIN[22:16]} | 8'B0 |
| BFLOAT16 | 10110 | 8'B0 | {1'B1,DIN[6:0]} | {1'B1,DIN[6:0]} | 8'B0 |
| FLOAT16 | 10111 | {DIN[18:16],5'B0} | {1'B1,DIN[25:19]} | {1'B1,DIN[25:19]} | {DIN[18:16],5'B0} |
| FLOAT16 | 11000 | {DIN[18:16],5'B0} | {1'B1,DIN[25:19]} | {1'B1,DIN[25:19]} | {DIN[18:16],5'B0} |
| FLOAT16 | 11001 | {DIN[2:0],5'B0} | {1'B1,DIN[9:3]} | {1'B1,DIN[9:3]} | {DIN[2:0],5'B0} |
| FLOAT24 | 11001 | DIN[31:24] | {1'B1,DIN[38:32]} | {1'B1,DIN[38:32]} | DIN[31:24] |
| FLOAT24 | 11010 | DIN[31:24] | {1'B1,DIN[38:32]} | {1'B1,DIN[38:32]} | DIN[31:24] |

*FIG. 13*

| OPERAND TYPES | MODEB | REG4B[7:0] | REG5B[7:0] | REG6B[7:0] | REG7B[7:0] |
|---|---|---|---|---|---|
| INT8 | 00000 | | | | |
| INT8 | 00001 | DIN[39:32] | DIN[47:40] | DIN[55:48] | DIN[63:56] |
| INT8 | 00010 | DIN[39:32] | DIN[47:40] | DIN[55:48] | DIN[63:56] |
| BFP8 | 00011 | | | | |
| BFP8_EXPB | 00100 | | | | |
| BFP8 | 00101 | DIN[39:32] | DIN[47:40] | DIN[55:48] | DIN[63:56] |
| BFP8 | 00110 | DIN[39:32] | DIN[47:40] | DIN[55:48] | DIN[63:56] |
| INT7 | 00111 | DIN[69:63] | | | |
| INT7 | 01000 | DIN[34:28] | DIN[41:35] | DIN[48:42] | DIN[55:49] |
| BFP7 | 01001 | | | | |
| INT6 | 01010 | DIN[65:60] | DIN[71:66] | | |
| INT6 | 01011 | DIN[29:24] | DIN[35:30] | DIN[41:36] | DIN[47:42] |
| INT6 | 01100 | DIN[29:24] | DIN[35:30] | DIN[41:36] | DIN[47:42] |
| BFP6 | 01101 | | | | |
| BFP6_EXPB | 01110 | DIN[59:54] | | | |
| BFP6 | 01111 | DIN[29:24] | DIN[35:30] | DIN[41:36] | DIN[47:42] |
| BFP6 | 10000 | DIN[29:24] | DIN[35:30] | DIN[41:36] | DIN[47:42] |
| INT16 | 10001 | | | | |
| INT16 | 10010 | | | | |
| BFLOAT16 | 10011 | | | | |
| BFLOAT16 | 10100 | | | | |
| BFLOAT16 | 10101 | | | | |
| FLOAT16 | 10110 | | | | |
| FLOAT16 | 10111 | | | | |
| FLOAT16 | 11000 | | | | |
| FLOAT24 | 11001 | | | | |
| FLOAT24 | 11010 | | | | |

*FIG. 14*

| OPERAND TYPES | MODEB | REG8B[7:0] | REG9B[7:0] | REG10B[7:0] | REG11B[7:0] |
|---|---|---|---|---|---|
| INT8 | 00000 | | | | |
| INT8 | 00001 | | | | |
| INT8 | 00010 | DIN[7:0] | DIN[15:8] | DIN[23:16] | DIN[31:24] |
| BFP8 | 00011 | | | | |
| BFP8_EXPB | 00100 | | | | |
| BFP8 | 00101 | | | | |
| BFP8 | 00110 | DIN[7:0] | DIN[15:8] | DIN[23:16] | DIN[31:24] |
| INT7 | 00111 | | | | |
| INT7 | 01000 | DIN[62:56] | DIN[69:63] | | |
| BFP7 | 01001 | | | | |
| INT6 | 01010 | | | | |
| INT6 | 01011 | DIN[53:48] | DIN[59:54] | DIN[65:60] | DIN[71:66] |
| INT6 | 01100 | DIN[5:0] | DIN[11:6] | DIN[17:12] | DIN[23:18] |
| BFP6 | 01101 | DIN[55:48] | DIN[63:56] | DIN[63:56] | DIN[55:48] |
| BFP6_EXPB | 01110 | | | | |
| BFP6 | 01111 | DIN[53:48] | DIN[59:54] | | |
| BFP6 | 10000 | DIN[5:0] | DIN[11:6] | DIN[17:12] | DIN[23:18] |
| INT16 | 10001 | DIN[55:48] | DIN[63:56] | DIN[63:56] | DIN[55:48] |
| INT16 | 10010 | DIN[23:16] | DIN[31:24] | DIN[31:24] | DIN[23:16] |
| BFLOAT16 | 10011 | 8'B0 | 8'B10000000 | 8'B10000000 | 8'B0 |
| BFLOAT16 | 10100 | 8'B0 | {1'B1,DIN[54:48]} | {1'B1,DIN[54:48]} | 8'B0 |
| BFLOAT16 | 10101 | 8'B0 | {1'B1,DIN[22:16]} | {1'B1,DIN[22:16]} | 8'B0 |
| FLOAT16 | 10110 | 8'B0 | 8'B10000000 | 8'B10000000 | 8'B0 |
| FLOAT16 | 10111 | {DIN[50:48],5'B0} | {1'B1,DIN[57:51]} | {1'B1,DIN[57:51]} | {DIN[50:48],5'B0} |
| FLOAT16 | 11000 | {DIN[18:16],5'B0} | {1'B1,DIN[25:19]} | {1'B1,DIN[25:19]} | {DIN[18:16],5'B0} |
| FLOAT24 | 11001 | 8'B0 | {1'B1,DIN[38:32]} | 8'B10000000 | 8'B0 |
| FLOAT24 | 11010 | DIN[31:24] | {1'B1,DIN[38:32]} | | DIN[31:24] |

*FIG. 15*

| OPERAND TYPES | MODEB | REG12B[7:0] | REG13B[7:0] | REG14B[7:0] | REG15B[7:0] |
|---|---|---|---|---|---|
| INT8 | 00000 | | | | |
| INT8 | 00001 | | | | |
| INT8 | 00010 | DIN[39:32] | DIN[47:40] | DIN[55:48] | DIN[63:56] |
| BFP8 | 00011 | | | | |
| BFP8_EXPB | 00100 | | | | |
| BFP8 | 00101 | | | | |
| BFP8 | 00110 | DIN[39:32] | DIN[47:40] | DIN[55:48] | DIN[63:56] |
| INT7 | 00111 | | | | |
| INT7 | 01000 | | | | |
| BFP7 | 01001 | | | | |
| INT6 | 01010 | | | | |
| INT6 | 01011 | | | | |
| INT6 | 01100 | DIN[29:24] | DIN[35:30] | DIN[41:36] | DIN[47:42] |
| BFP6 | 01101 | | | | |
| BFP6_EXPB | 01110 | | | | |
| BFP6 | 01111 | | | | |
| BFP6 | 10000 | DIN[29:24] | DIN[35:30] | DIN[41:36] | DIN[47:42] |
| INT16 | 10001 | | | | |
| INT16 | 10010 | | | | |
| BFLOAT16 | 10011 | | | | |
| BFLOAT16 | 10100 | | | | |
| BFLOAT16 | 10101 | | | | |
| FLOAT16 | 10110 | | | | |
| FLOAT16 | 10111 | | | | |
| FLOAT16 | 11000 | | | | |
| FLOAT24 | 11001 | | | | |
| FLOAT24 | 11010 | | | | |

FIG. 16

MULTIPLE MODE ARITHMETIC CIRCUIT

PRIORITY APPLICATIONS

This application is a continuation of U.S. patent application Ser. No. 16/535,878, filed Aug. 8, 2019, the content of which is incorporated herein by reference in its entirety.

BACKGROUND

A field programmable gate array (FPGA) is composed of an array of programmable logic blocks that are interconnected with a reconfigurable routing network. Logic blocks vary in type and typically include reconfigurable logic, memories, and arithmetic logic. Reconfigurable logic is commonly implemented with lookup tables.

Different logic blocks are used to provide arithmetic functions in different modes (e.g., an integer mode and a floating-point mode). Accordingly, an FPGA that provides arithmetic functions in multiple modes dedicates some tiles to each mode.

BRIEF DESCRIPTION OF THE DRAWINGS

Some embodiments of the disclosed technology are illustrated by way of example and not limitation in the figures of the accompanying drawings.

FIG. 9 is a table showing operand types and inputs for four operands of a multiple mode arithmetic circuit, according to some example embodiments.

FIG. 10 is a table showing operand types and inputs for four operands of a multiple mode arithmetic circuit, according to some example embodiments.

FIG. 11 is a table showing operand types and inputs for four operands of a multiple mode arithmetic circuit, according to some example embodiments.

FIG. 12 is a table showing operand types and inputs for four operands of a multiple mode arithmetic circuit, according to some example embodiments.

FIG. 13 is a table showing operand types and inputs for four operands of a multiple mode arithmetic circuit, according to some example embodiments.

FIG. 14 is a table showing operand types and inputs for four operands of a multiple mode arithmetic circuit, according to some example embodiments.

FIG. 15 is a table showing operand types and inputs for four operands of a multiple mode arithmetic circuit, according to some example embodiments.

FIG. 16 is a table showing operand types and inputs for four operands of a multiple mode arithmetic circuit, according to some example embodiments.

DETAILED DESCRIPTION

Example methods, systems and circuits for a multiple mode arithmetic circuit will now be described. In the following description, numerous examples having example-specific details are set forth to provide an understanding of example embodiments. It will be evident, however, to one of ordinary skill in the art that these examples may be practiced without these example-specific details, and/or with different combinations of the details than are given here. Thus, specific embodiments are given for the purpose of simplified explanation, and not limitation.

A tile of an FPGA includes a multiple mode arithmetic circuit. The multiple mode arithmetic circuit is configured by control signals to operate in an integer mode, a floating-point mode, or both. In some example embodiments, multiple integer modes (e.g., unsigned, two's complement, and sign-magnitude) are selectable, multiple floating-point modes (e.g., 16-bit mantissa and 8-bit sign, 8-bit mantissa and 6-bit sign, and 6-bit mantissa and 6-bit sign) are supported, or any suitable combination thereof.

The tile may also fuse a memory circuit with the arithmetic circuits. Connections directly between multiple instances of the tile are also available, allowing multiple tiles to be treated as larger memories or arithmetic circuits. By using these connections, referred to as cascade inputs and outputs, the input and output bandwidth of the arithmetic circuit is further increased.

By providing a multiple mode arithmetic circuit on a tile of an FPGA, the versatility of the tile and the resulting FPGA is increased. As a result, more tiles of the FPGA can be used under a wider variety of circumstances, improving the bandwidth of the arithmetic processing and reducing computation time in comparison to prior art implementations in which single mode arithmetic circuits are used. Though described herein as being provided on a tile of an FPGA, the multiple mode arithmetic circuit may also be used in an ASIC or hardened FPGA.

Figure 1:
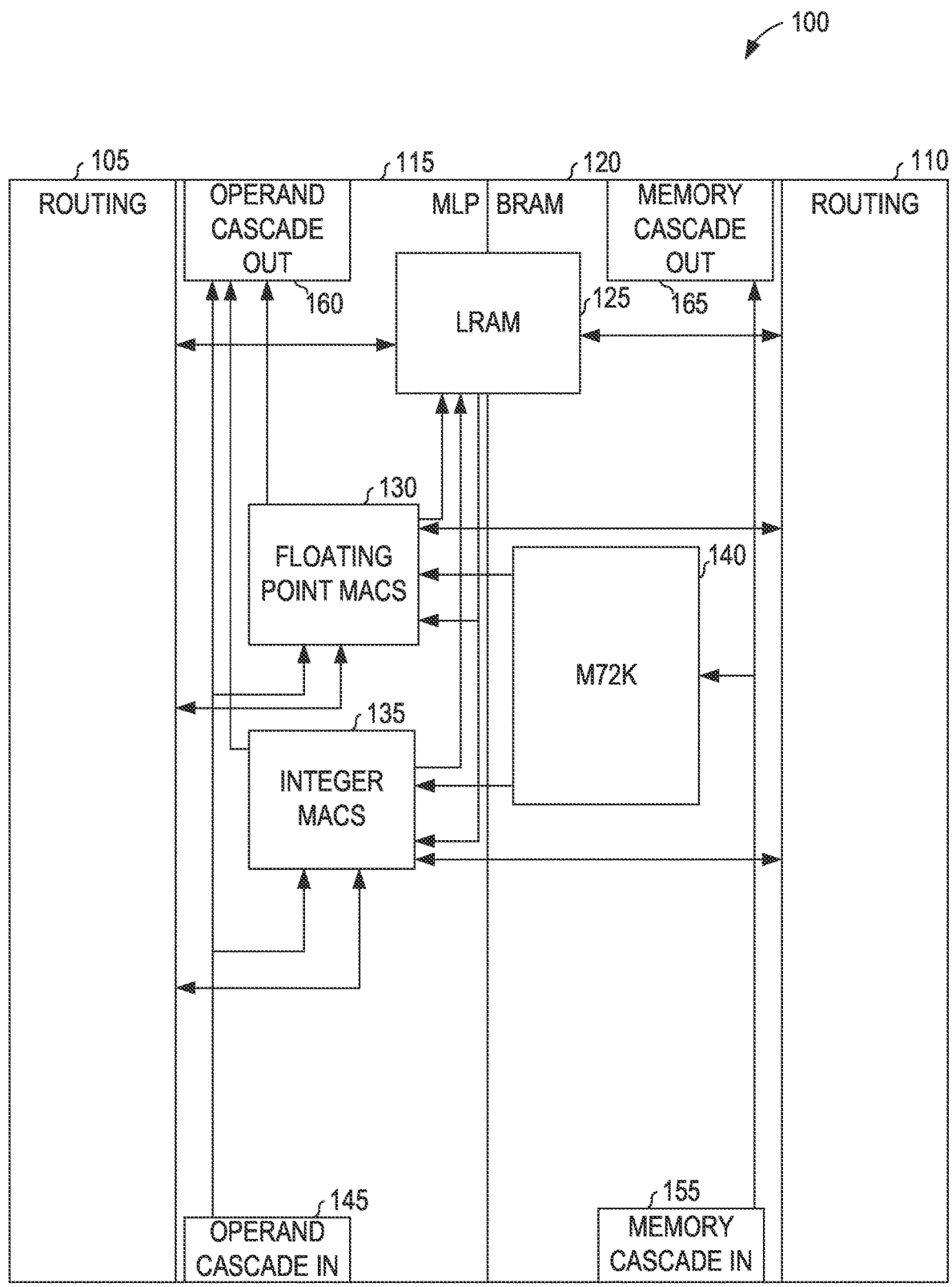
FIG. 1 is a high-level diagrammatic view of a tile of an FPGA that uses a multiple mode arithmetic circuit, according to some example embodiments.

FIG. 1 is a high-level diagrammatic view of a tile 100 of an FPGA along with connected routing 105 and 110. The tile 100 fuses memory and arithmetic circuits and comprises a machine-learning processor (MLP) 115, a block random access memory (BRAM) 120, and a logic random access memory (LRAM) 125. The MLP 115 comprises a floating-point multiply and accumulate (MAC) 130 and an integer MAC 135. The BRAM 120 comprises a memory 140.

In a first operation mode, the MACs 130 and 135 receive inputs from one or more of the routing 105, the LRAM 125, the memory 140, and an operand cascade input 145. Outputs are provided by the MACs 130 and 135 to the routing 105, an operand cascade output 160, the LRAM 125, or any suitable combination thereof. The memory 140 receives input from the routing 110, a memory cascade input 155, or both. Outputs are provided by the memory 140 to the routing 110, a memory cascade output 165, or both. In the first operation mode, the MACs 130 and 135 do not receive input from the routing 110 and the memory 140 does not receive input from the routing 105. Thus, the inputs from the routing fabric of the FPGA are divided between the MLP 115 and the BRAM 120, and the MLP 115 accesses data from the BRAM 120 within the tile 100, without going through the switch fabric.

A typical MAC multiplies two or more products and adds the results to an accumulator. The MACs 130 and 135, in some example embodiments, provide additional functionality by allowing partial products to be summed and provided as an output before being added to the accumulator. Thus, the individual partial products, sums of partial products for a current multiplication, and an accumulation result across multiple multiplication cycles may all be accessed by use of the MACs 130 and 135. Though a single box is shown in FIG. 1 for MACs 130 and 135, in some example embodiments, multiple MACs of each type are used (e.g., two integer MACs and two floating-point MACs).

In a second operation mode, the MACs 130 and 135 receive inputs from one or more of the routing 105, the routing 110, the LRAM 125, and the operand cascade input 145. Outputs are provided by the MACs 130 and 135 to the routing 105, the routing 110, the operand cascade output 160, the LRAM 125, or any suitable combination thereof. In the second operation mode, the memory 140 does not receive inputs from the routing 105 or the routing 110. Thus, in the second operation mode, the tile 100 operates as a dedicated MLP, with MLP 115 having full access to the routing fabric of the FPGA and the memory 140 effectively disabled. Nonetheless, the LRAM 125 may make use of some routing connections in the second operation mode.

In a third operation mode, the memory 140 receives input from the routing 105, the routing 110, the memory cascade input 155, or any suitable combination thereof. Outputs are provided by the memory 140 to the routing 105, the routing 110, the memory cascade output 165, or any suitable combination thereof. In the third operation mode, the MLP 115 does not receive inputs from the routing 105 or the routing 110. Thus, in the third operation mode, the tile 100 operates as a dedicated BRAM, with BRAM 120 having full access to the routing fabric of the FPGA and the MLP 115 effectively disabled.

As shown in FIG. 1, the LRAM 125 is connected to the routing 105 and the routing 110. In some example embodiments, the routing connections for the LRAM 125 are maintained in all operation modes. To use data stored in the LRAM 125 for calculations by the MLP 115, control signals identify the address to read and the data from the LRAM 125 that is to be used. The data is provided from the LRAM 125 to the MLP 115 via intra-tile connections, without using the routing 105 or the routing 110.

The intra-tile connections shown between the LRAM 125 and the memory 140 to the floating-point MAC 130 and the integer MAC 135 operate at a higher bandwidth than the routing 105 and 110. In various example embodiments, the intra-tile data access speed is a factor of at least 10, 50, 100, or 500 times faster than the routing connection access speed.

The differences between the LRAM 125 and the BRAM 120 are typically implementation details such that the BRAM 120 is similar to a cache style memory (typically using SRAM cells) and the LRAM 125 is similar to a register file (typically using flops). However, these are not concrete rules, and other types of memory may be used for the LRAM 125 and the BRAM 120. In some example embodiments, the BRAM 120 has a greater storage capacity than the LRAM 125 and is optimized for area and the LRAM 125 is optimized for latency. In further example embodiments, the LRAM 125 stores a working set of sums of partial products for matrix multiplications.

The FPGA tile 100 receives a clock input to control the rate at which operations are performed. A frequency multiplier (e.g., a 2× multiplier) may be applied to the input clock frequency to change the operation rate. In some example embodiments, running the FPGA tile 100 at twice the clock rate allows twice as many calculations to be performed by using the MAC 130 or the MAC 135 twice in a single (external) clock cycle. For example, in a 128-bit input mode, sufficient inputs may be provided to perform four calculations per clock cycle but the MAC hardware is sufficient to perform only two. Accordingly, by performing two calculations on each of two internal clock cycles, four calculations are performed on the single external clock cycle, allowing the FPGA tile 100 to perform as effectively as an alternative design comprising twice as many MACs.

As another example of an advantage of using a frequency multiplier, operations that reuse at least some of the input operands may be performed more efficiently. For example, when weights or coefficients from the routing 105 are the same for multiple operations, other coefficients may be updated using the higher-frequency internal clock (e.g., read from the BRAM 120) and the multiple operations performed within a single external clock cycle. One practical use of this advantage is in machine learning, with a batch size equal to the clock multiplier (e.g., 2). The results of the multiple operations may be accumulated together to generate a single output to the routing 105 per external clock cycle, output in parallel to the routing 105 if there are sufficient output pins, or stored in the BRAM 120.

Figure 2:
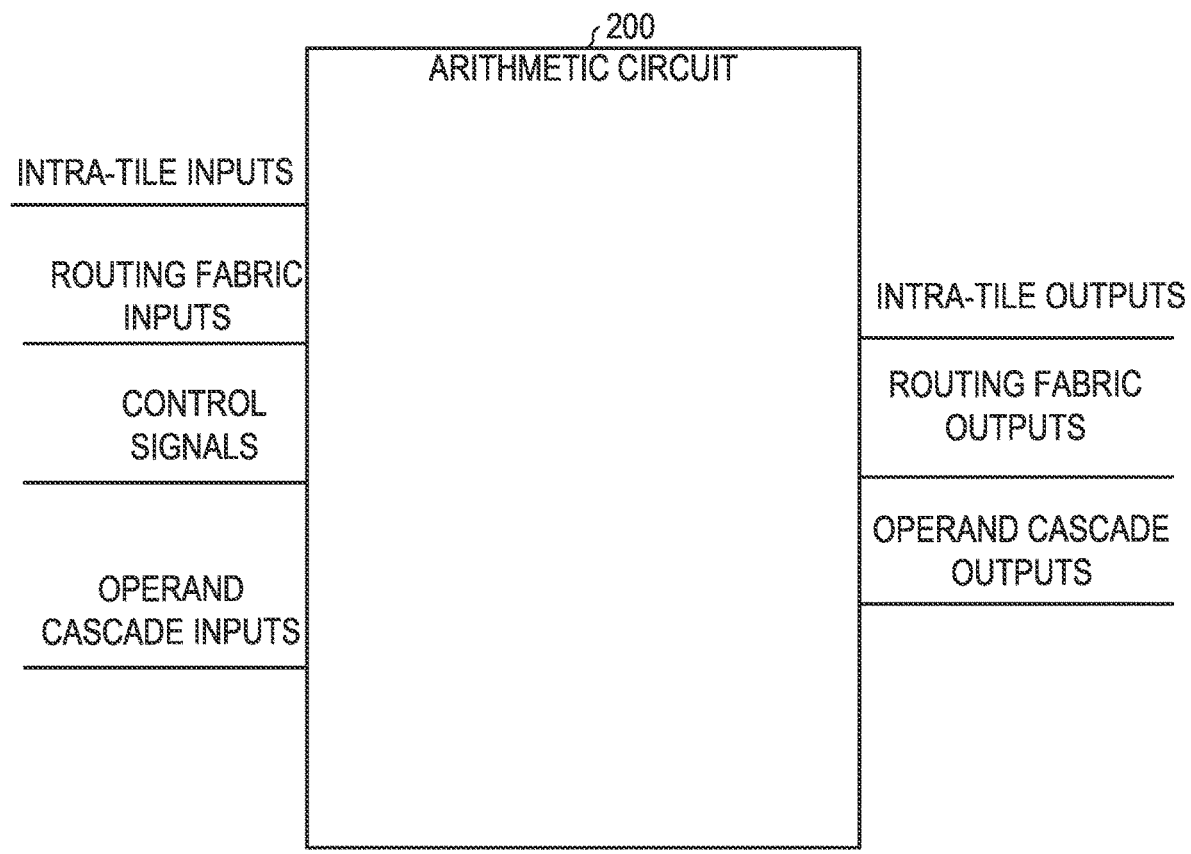
FIG. 2 is a high-level diagrammatic view of a multiple mode arithmetic circuit, according to some example embodiments.

FIG. 2 is a high-level diagrammatic view of an arithmetic circuit portion 200 of a multiple mode arithmetic circuit, according to some example embodiments. In some example embodiments, the arithmetic circuit 200 is the MLP 115. The arithmetic circuit 200 receives intra-tile inputs from the memory portion of the FPGA tile, routing fabric inputs from a routing fabric of the FPGA, control signals from the routing fabric of the FPGA, and operand cascade inputs from another FPGA tile without making use of the routing fabric. In various example embodiments, more or fewer inputs are present.

The arithmetic circuit 200 provides intra-tile outputs to the memory portion of the FPGA tile, routing fabric outputs to the routing fabric of the FPGA, and operand cascade outputs to another FPGA tile without making use of the routing fabric. In various example embodiments, more or fewer outputs are present. Typically, the operand cascade inputs are received from a first FPGA tile, the arithmetic circuit 200 is part of a second FPGA tile, and the operand cascade outputs are provided to a third FPGA tile.

Figure 3:
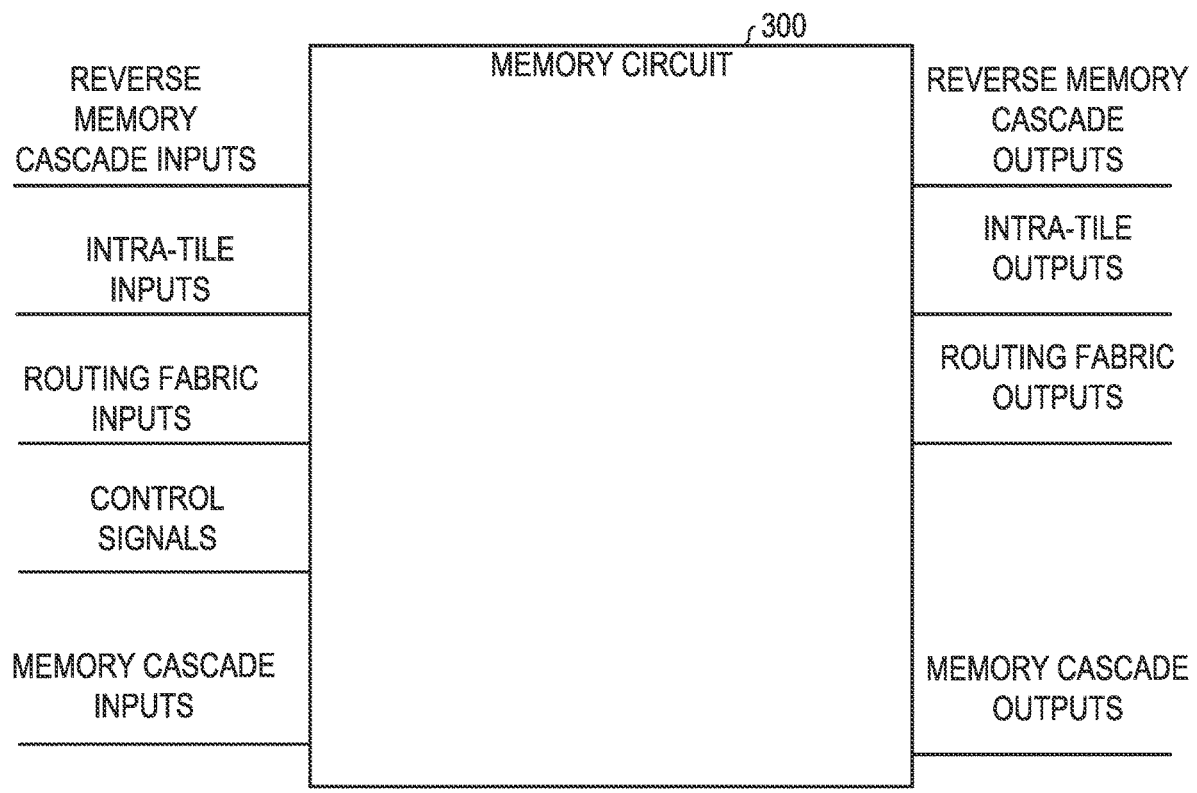
FIG. 3 is a high-level diagrammatic view of a memory circuit portion of an FPGA tile that fuses memory and arithmetic circuits, according to some example embodiments.

FIG. 3 is a high-level diagrammatic view of a memory circuit portion 300 of an FPGA tile that fuses memory and arithmetic circuits, according to some example embodiments. In some example embodiments, the memory circuit 300 is the BRAM 120. The memory circuit 300 receives intra-tile inputs from the arithmetic portion of the FPGA tile, routing fabric inputs from a routing fabric of the FPGA, control signals from the routing fabric of the FPGA, memory cascade inputs from a first FPGA tile, and reverse memory cascade inputs from a second FPGA tile. The cascade inputs do not make use of the routing fabric. The memory cascade inputs may comprise control signals as well as data signals. In various example embodiments, more or fewer inputs are present.

The memory circuit 300 provides intra-tile outputs to the arithmetic portion of the FPGA tile, routing fabric outputs to the routing fabric of the FPGA, memory cascade outputs to the second FPGA tile, and reverse memory cascade outputs to the first FPGA tile. In various example embodiments, more or fewer outputs are present.

Figure 4:
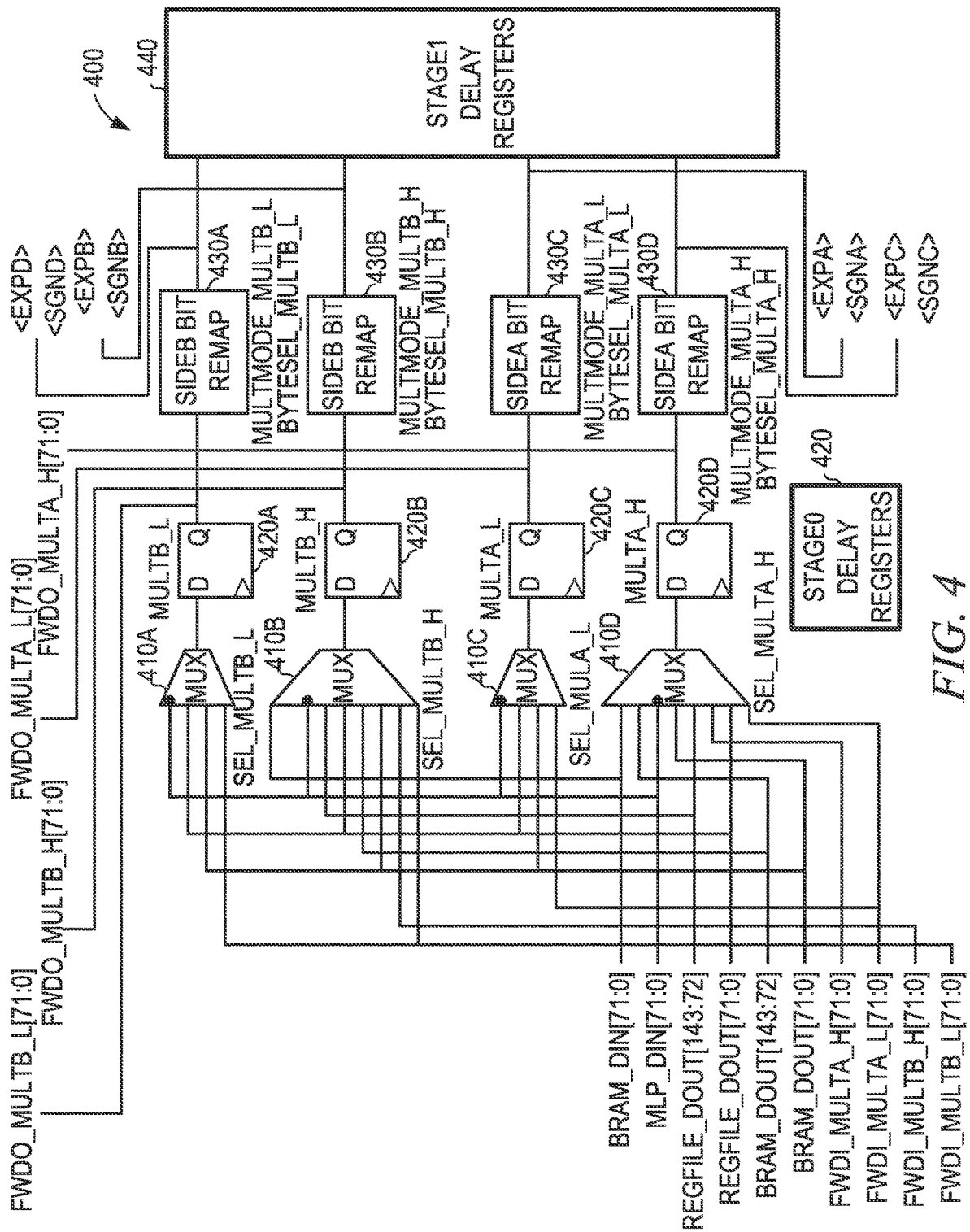
FIG. 4 is a diagrammatic view of a portion of a multiple mode arithmetic circuit, according to some example embodiments.

FIG. 4 is a diagrammatic view of a portion 400 of a multiple mode arithmetic circuit, according to some example embodiments. The portion 400 comprises multiplexers 410A, 410B, 410C, and 410D; registers 420A, 420B, 420C, and 420D, referred to collectively as stage 0 delay registers 420; bit remap logic 430A, 430B, 430C, and 430D; and stage 1 delay registers 440 (shown in more detail as individual registers 510A, 510B, 510C, 510D, 510E, 510F, 510G, 510H, 510I, 510J, 510K, 510L, 510M, 510N, 510O, and 510P in FIG. 5). The portion 400 accepts inputs for two multiply operands, A and B, remaps the operands to a format used by the next portion of the arithmetic circuit, and provides the remapped operands to delay registers used by the next portion.

The multiplexer 410A selects the low bits for the B operand from four options: MLP_DIN[71:0], 72 bits of data received via the routing fabric 105; REGFILE_DOUT[71:0], 72 bits of data received from the LRAM 125 within the tile 100; BRAM_DOUT[71:0], 72 bits of data received from the BRAM 120 within the tile 100; and FWDI_MULTB_L[71:0], 72 bits of data received from the operand cascade input 145. The multiplexer 410B selects the high bits for the B operand from eight options: BRAM_DIN[71:0], 72 bits of data received via the routing fabric 110; REGFILE_DOUT[143:72], 72 bits of data received from the LRAM 125 within the tile 100; BRAM_DOUT[143:72], 72 bits of data received from the BRAM 120 within the tile 100; MLP_DIN[71:0]; REGFILE_DOUT[71:0]; BRAM_DOUT[71:0]; and FWDI_MULTB_L[71:0]. Thus, the B operand is generated from a combination of inputs from one or more of the routing fabric 105, the routing fabric 110, the LRAM 125, the BRAM 120, and the operand cascade input 145.

The low bits for the A operand are selected by the multiplexer 410C from four options: MLP_DIN[71:0]; REGFILE_DOUT[71:0]; BRAM_DOUT[71:0]; and FWDI_MULTA_L[71:0], 72 bits of data received from the operand cascade input 145. The high bits for the A operand are selected by the multiplexer 410D from eight options: BRAM_DIN[71:0]; MLP_DIN[71:0]; REGFILE_DOUT[143:72]; REGFILE_DOUT[71:0]; FWDI_MULTA_L[71:0]; BRAM_DOUT[143:72]; BRAM_DOUT[71:0]; and FWDI_MULTA_H[71:0], 72 bits of data received from the operand cascade input 145. Thus, the A operand is also generated from a combination of inputs from one or more of the routing fabric 105, the routing fabric 110, the LRAM 125, the BRAM 120, and the operand cascade input 145.

The inputs selected by the multiplexers 410A-410D are optionally stored in the corresponding one of the registers 420A-420D, which provide data to the operand cascade output 160 in the form of FWDO_MULTB_L[71:0], the low bits of the B operand; FWDO_MULTB_H[71:0], the high bits of the B operand; FWDO_MULTA_L[71:0], the low bits of the A operand; and FWDO_MULTA_H[71:0], the high bits of the A operand. Additionally, each of the registers 420A-420D is accessed by the corresponding one of the bit remap logics 430A-430D. Each of the bit remap logics 430A-430D remaps the inputs based on a multiplication mode and byte selection mode input. Exponent and sign bits are output from the bit remap logics 430A-430D as signals <EXPA>, <SGNA>, <EXPB>, <SGNB>, <EXPC>, <SGNC>, <EXPD>, and <SGND>. The remapped inputs are provided to the stage 1 delay registers 440, for access by the next portion of the arithmetic circuit.

In a floating-point mode that differs from the floating-point format used by the portion 500, the bit remap logics 430A-430D convert the inputs to a format expected by the portion 500. In an example, the portion 500 expects floating-point values with a 15-bit mantissa, a one-bit sign, and an 8-bit exponent. In this example, the multiple mode arithmetic circuit supports inputs and outputs using various combinations of 16-bit mantissas, 10-bit mantissas, 12-bit mantissas, 8-bit exponents, 6-bit exponents, and 5-bit exponents. Based on the input format and the format expected by the portion 500, the bit remap logics 430A-430D convert the input values. In this example, selection of the input floating-point format is in response to a mode selection input.

The bit remap logics 430A-430D, in some example embodiments, perform sign extension. As a result, operands that are smaller than the size of the input values accepted by the arithmetic blocks (e.g., the multipliers 520A-520H) are routed using only the routing resources necessary for the operands and sign-extended by the bit remap logics 430A-430D prior to use by the arithmetic blocks. By comparison with designs that perform sign extension prior to routing, this design saves routing resources.

The integer arithmetic logic blocks may be used to perform floating-point operations on the mantissas of floating-point operands by identifying the highest exponent among the exponents of the floating-point operands and right-shifting the mantissas of the other operands by the difference in exponents. For example, consider the table below, showing four operands.

| Original Mantissa | Original Exponent | Adjusted Mantissa | Adjusted Exponent |
|---|---|---|---|
| 10101010 | 0001 | 11110101 | 0100 |
| 11110000 | 0010 | 11111100 | 0100 |
| 00110011 | 0011 | 00011001 | 0100 |
| 00001111 | 0100 | 00001111 | 0100 |

After the adjustment, the mantissas of the operands can be manipulated as integers, since all exponents are equal. This floating-point mode is referred to as block floating-point since in all of the numbers being operated on are grouped together (in a "block") with a common exponent value.

In the example above, note that the first two operands have their mantissas padded with 1s and the last two operands have their mantissas padded with 0s. This is consistent with 2's complement representation of negative numbers. In an unsigned mode or a signed/magnitude mode, the manipulation of the mantissa changes accordingly either by padding with 0s (for unsigned) or inserting 0s without modifying the sign bit (sign/magnitude).

Figure 5:
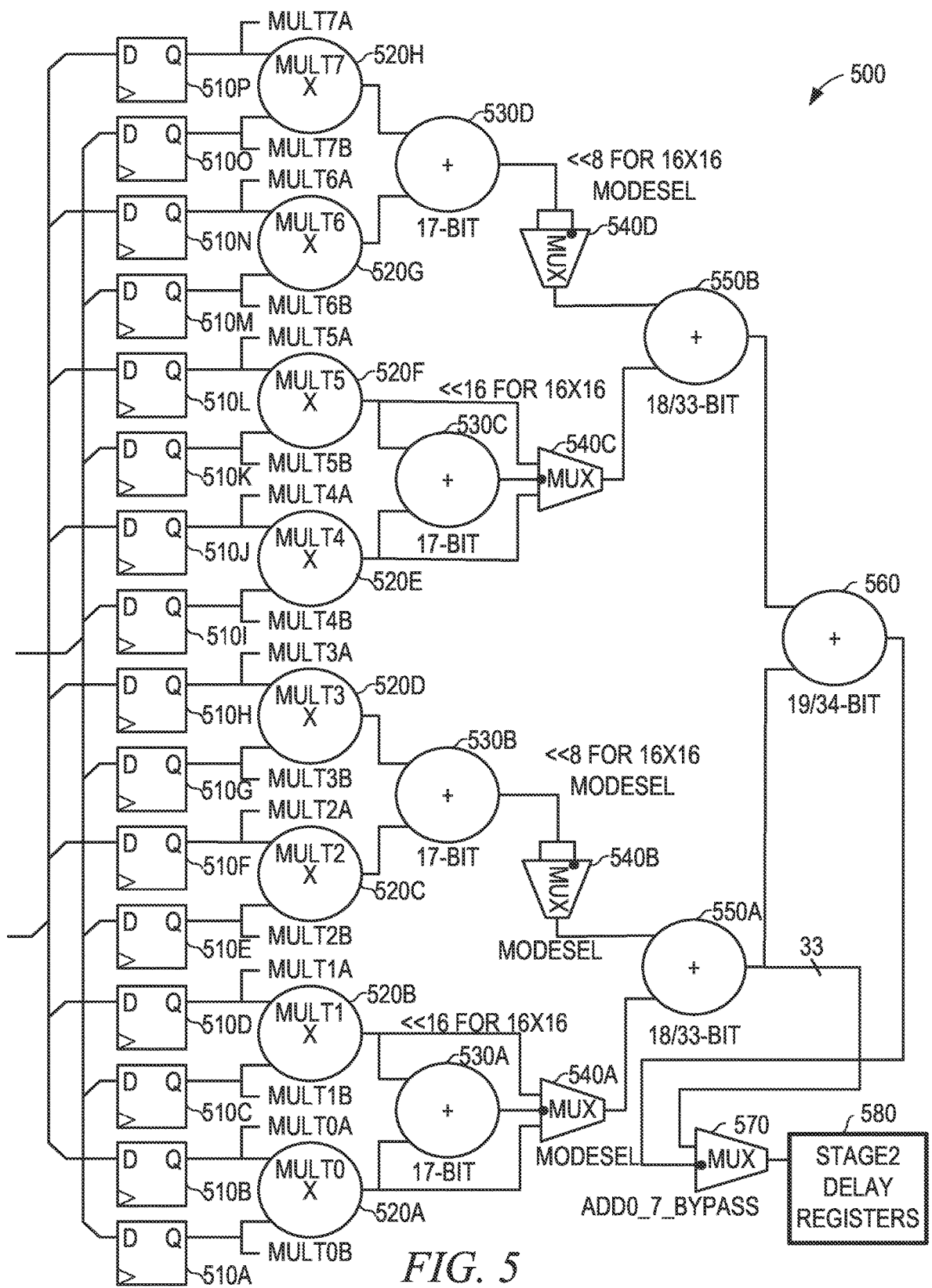
FIG. 5 is a diagrammatic view of a portion of a multiple mode arithmetic circuit, according to some example embodiments.

FIG. 5 is a diagrammatic view of a portion 500 of a multiple mode arithmetic circuit, according to some example embodiments. The portion 500 comprises registers 510A, 510B, 510C, 510D, 510E, 510F, 510G, 510H, 510I, 510J, 510K, 510L, 510M, 510N, 510O, and 510P; multipliers 520A, 520B, 520C, 520D, 520E, 520F, 520G, and 520H; adders 530A, 530B, 530C, 530D, 550A, 550B, and 560; multiplexers 540A, 540B, 540C, 540D, and 570; and stage 2 delay registers 580.

Each of the registers 510A-510P stores eight bits of data for an operand for one of the multipliers 520A-520H. Each of the multipliers 520A-520H accepts eight bits of the A operand and eight bits of the B operand. Thus, the portion 500, in total, handles 64 bits of the A operand and 64 bits of the B operand. To handle the complete input received by the portion 400, the portion 500 is duplicated, with each instance of the portion 500 handling half of the inputs.

In a first operation mode, the portion 500 is configured to determine a sum of eight 8-bit multiply operations. By sign-extending or padding with leading zeros, as appropriate, the sum of fewer multiply operations or the sum of eight smaller (e.g., 6-bit or 4-bit) operations may be determined in the first operation mode. In a first variation of the first operation mode, each of the multipliers 520A-520H is an eight-bit multiplier that is configured to output the sum of two four-bit multiplies. In a second variation of the first operation mode, each of the multipliers 520A-520H is an eight-bit multiplier that is configured to output the result of two four-bit multiplies. In a second operation mode, the portion 500 is configured to output a sum of two 16-bit multiply operations. By sign-extending or padding with leading zeros, as appropriate, a single multiply operation or the sum of two smaller (e.g., 12-bit or 10-bit) operations may be determined in the second operation mode. In a third operation mode, the portion 500 in combination with the second instance of the portion 500 is configured, using an additional shifter and a wider adder, to determine a single 32-bit multiply operation. By sign-extending or padding with leading zeros, as appropriate, a smaller multiply operation (e.g., 18-bit or 24-bit) may be determined in the third operation mode. In additional operation modes, one or more individual multiply results may be provided at the output, in addition to or instead of the sum of the multiply operations.

With respect to the first operation mode, each of the eight multipliers 520A-520H performs an eight-bit multiplication using a different portion of the operands A and B as inputs. The results of the eight multiplications are pairwise summed by the adders 530A-530D. The four addition results are pairwise summed by the adders 550A-550B, using the multiplexers 540A-540D (controlled by a MODESEL signal) to determine whether to take the additional result directly or shifted as shown. The shifted results are used to support 16-bit multiplication. The two results of the adders 550A-550B are summed by the adder 560. The result of the adder 560 is the sum of the eight eight-bit multiplications, and is provided, via the mux 570, to the stage 2 delay registers 580.

With respect to the second operation mode, the multipliers 520A-520D together, in combination with the adders 530A, 530B, and 550A, determine a first 16-bit multiplication result. The multipliers 520E-520H, in combination with the adders 530C, 530D, and 550B, determine a second 16-bit multiplication result. Four multipliers of a first operand size can be used to generate multiplication results of a second operand size that is twice the first operand size. The larger operands are divided into two portions, high and low, and organized as follows, wherein AH represents the high portion of the A operand, AL represents the low portion of the A operand, BH represents the high portion of the B operand, and BL represents the low portion of the B operand. AH AL×BH BL=AL×BL+AH×BL<<SIZE+BH×AL<<SIZE+ AH×BH<<2×SIZE. Since doubling the size of the operand uses four multipliers of the original size to perform one multiplication at the larger size, the number of operations performed by the arithmetic circuit is reduced (in this case by a factor of four) when the size of the operands is increased (in this case by a factor of two). Each of the four component multiplication results is a partial product. The partial product results are summed to generate the final multiplication result. The particular value of "SIZE" is implementation-dependent. 8 bits is used by way of example herein. Additionally, the process of combining four multipliers to operate as a larger multiplier may be repeated, so that four larger multipliers (16 original multipliers) are used to form an even larger multiplier. Thus, in an example embodiment, the MLP 115 provides 64 4-bit multipliers, 16 8-bit multipliers, 4 16-bit multipliers, or one 32-bit multiplier.

Thus, in the second operation mode, the multiplier 520D multiplies BL with AH and the multiplier 520C multiplies BH with AL. The results are added by the adder 530B and the result from the adder 530B is shifted left eight bits. The multiplier 520B multiplies BH with AH and the result is shifted left sixteen bits. The multiplier 520A multiples BL with AL. Following the results through the adders 530A and 550A, the output of the adder 550A is the result of the 16-bit multiply operation. The multipliers 520E-520H and adders 530C, 530D, and 550B are similarly configured to process a second 16-bit multiply operation. The results of the two operations are summed by the adder 560 and provided to the stage 2 delay registers 580 via the multiplexer 570. The size of the output of the adder 560 is one bit larger than size of the outputs of the adders 550A and 550B. Thus, in an eight-bit mode of operation, the adder 560 provides a 19-bit output and in a sixteen-bit mode of operation, the adder 560 provides a 34-bit output.

In some example embodiments, the portion 500 performs only a single 16-bit multiply in the second operation mode. In these embodiments, the results generated by the multipliers 520E-520H and the adders 530C, 530D, 550B, and 560 are ignored. Instead, the multiplexer 570 is configured to provide the output from the adder 550A, containing the single 16-bit multiply result, to the stage 2 delay registers 580.

In the third operation mode, the four 16-bit multiply operations provided by two instances of the portion 500 are combined in a manner analogous to that described with respect to the second operation mode, using an additional shifter and a wider adder, resulting in a circuit that determines a single 32-bit multiplication, making use of the adder 630 discussed below with respect to FIG. 6.

Though the portion 500 is described as performing multiplication operations on the selected inputs and then summing the result of the multiplication operations, other configurations of the arithmetic circuit are contemplated. For example, the inputs from the registers 510A-510P may be provided to the multipliers 520A-520H as shown and also be provided to a set of adders. Using a multiplexer for each multiplier/adder pair, the input to the adders 530A-530D is selected either as the multiplication result or the addition result. Thus, based on a configuration signal controlling the multiplexers, the arithmetic circuit either determines a sum of the input operands or the sum of products of the input operands (as shown in FIG. 5).

As mentioned previously, to handle the complete input received by the portion 400, the portion 500 is duplicated, with each instance of the portion 500 handling half of the inputs. The portion 500 and its duplicate may be configured independently. Thus, different portions of the multiple mode arithmetic logic circuit may be configured to simultaneously perform integer and floating-point operations.

Figure 6:
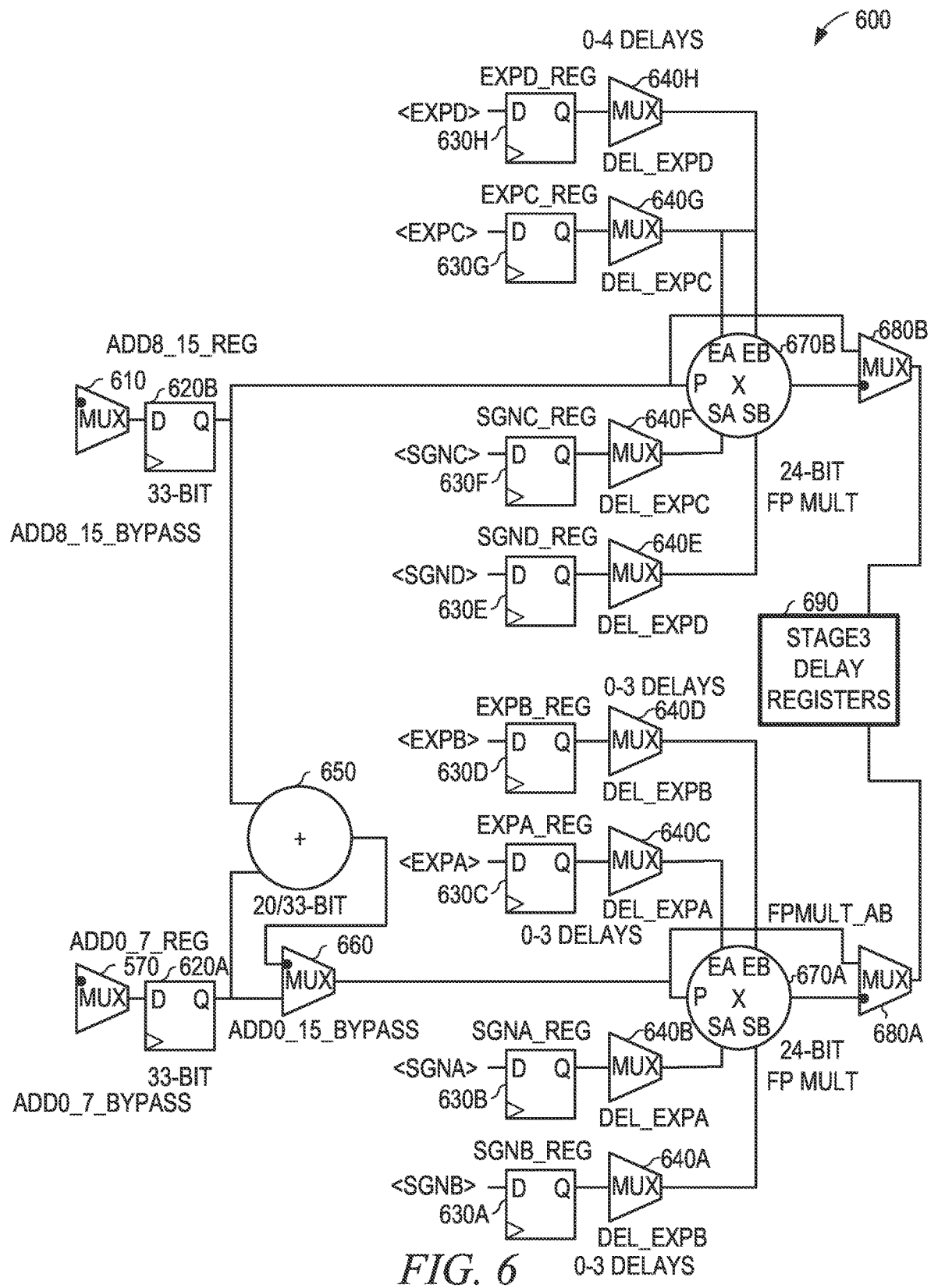
FIG. 6 is a diagrammatic view of a portion of a multiple mode arithmetic circuit, according to some example embodiments.

FIG. 6 is a diagrammatic view of a portion 600 of a multiple mode arithmetic circuit, according to some example embodiments. The portion 600 comprises the multiplexer 570 of FIG. 5 and the corresponding multiplexer 610 from a duplicate of the portion 500 that handles the high half of the inputs A and B. The outputs of the multiplexers 570 and 610 are provided to the stage 2 delay registers 620A and 620B, each 34 bits wide. Inputs to the portion 600 are also received from the stage 1 delay registers 630A, 630B, 630C, 630D, 630E, 630F, 630G, and 630H, storing the <SGNA>, <SGNB>, <SGNC>, <SGND>, <EXPA>, <EXPB>, <EXPC>, and <EXPD> values generated by the bit remap logics 430A-430D of FIG. 4. The portion 600 further includes an adder 650; multiplexers 640A, 640B, 640C, 640D, 640E, 640F, 640G, 640H, 660, 680A, and 680B; multipliers 670A and 670B; and stage 3 delay registers 690.

The results from the portion 500 and its duplicate are added by the adder 650. The multiplexer 660 selects either the results from the portion 500 or the summed results from both portions, based on a value of an ADD0_15_BYPASS signal, and provides the selected result to the multiplier 670A and the multiplexer 680A. Based on the <EXPA>, <EXPB>, <SGNA>, and <SGNB> values received via the multiplexers 640A-640D and the value received from the multiplexer 660, the multiplier 670A generates a 24-bit floating-point multiplication result. Similarly, based on the <EXPC>, <EXPD>, <SGNC>, and <SGND> values received via the multiplexers 640E-640H and the result received from the register 620B, the multiplier 670B generates a second 24-bit floating-point multiplication result. Based on an FPMULT_AB signal, the multiplexers 680A-680B output either the 24-bit floating-point results generated by the multipliers 670A-670B or pass through the results provided by the register 620B and the multiplexer 660. The outputs of the multiplexers 680A-680B are provided to the stage 3 delay registers 690.

Thus, in one operation mode, the outputs of the multiplexers 680A-680B of the portion 600 are the outputs of the portion 500 and its duplicate portion, bypassing the adder 650 and the multipliers 670A-670B. In a second operation mode, the output of the multiplexer 680A is the sum of all multiplies performed by the portion 500 and its duplicate and the output of the multiplexer 680B is the sum of the multiplies performed by the duplicate of the portion 500. In a third operation mode, the output of the multiplexers 680A-680B are 24-bit floating-point versions of the outputs of the portion 500 and its duplicate portion. In a fourth operation mode, the output of the multiplexer 680A is a 24-bit floating-point representation of the sum of all multiplies performed by the portion 500 and its duplicate and the output of the multiplexer 680B is a 24-bit floating-point representation of the sum of the multiplies performed by the duplicate of the portion 500.

Figure 7:
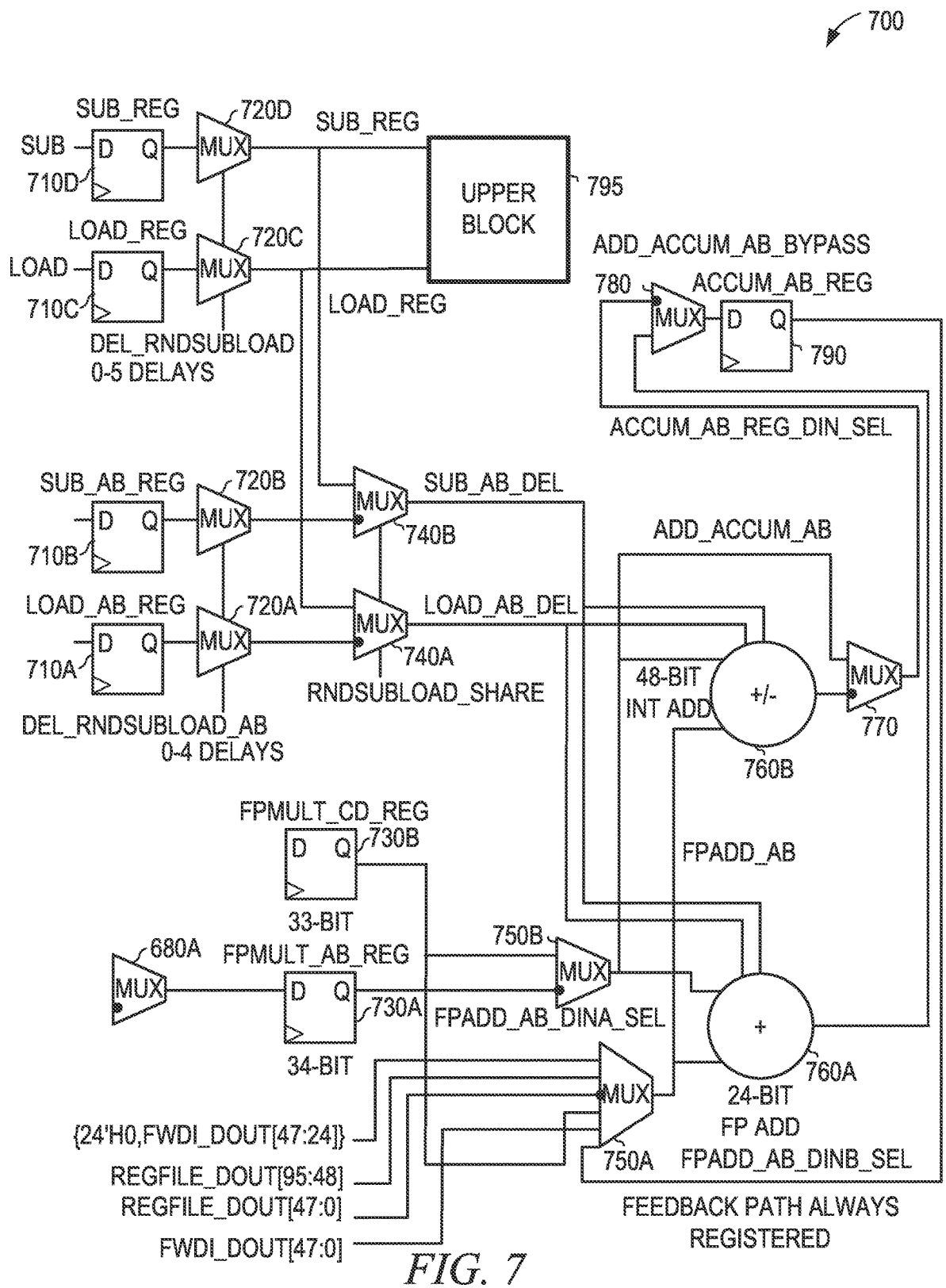
FIG. 7 is a diagrammatic view of a portion of a multiple mode arithmetic circuit, according to some example embodiments.

FIG. 7 is a diagrammatic view of a portion 700 of a multiple mode arithmetic circuit, according to some example embodiments. The portion 700 includes the multiplexer 680A of FIG. 6; stage 1 delay registers 710A, 710B, 710C, and 710D; multiplexers 720A, 720B, 720C, 720D, 740A, 740B, 750A, 750B, 770, and 780; stage 3 delay registers 730A and 730B; adders 760A and 760B; stage 4 delay register 790. Connections between the portion 700 and upper block 795 are also shown in FIG. 7. The upper block 795 refers to the portion of the arithmetic circuit shown in FIG. 8.

The output of the multiplexer 680A is stored in the stage 3 delay register 730A. The stage 3 delay register 730B stores either the output of the multiplexer 660B of FIG. 6 or an addition result generated by adding the output of the multiplexer 660B to FWDI_DOUT[47:0], as described below with respect to FIG. 8.

The multiplexer 750A selects a value from FWDI_DOUT[47:0], REGFILE_DOUT[47:0], 48 bits from the LRAM 125; REGFILE_DOUT[95:48], a different 48 bits from the LRAM 125; delay register 730B; and {24'H0, FWDI_DOUT[47:24]}, 24 0 bits prepended to 24 bits of the operand cascade input. The multiplexer 750B selects a value from the stage 3 delay registers 730A and 730B. The outputs of the multiplexers 750A and 750B are provided to the adder 760A and the adder 760B. Based on the SUB_AB_DEL and LOAD_AB_DEL signals received from the multiplexers 740A and 740B and the selected values received from the multiplexers 750A and 750B, the adder 760A generates an addition result. Based on the SUB_AB_DEL and LOAD_AB_DEL signals received from the multiplexers 740A and 740B and the selected values received from the multiplexers 750A and 750B, the adder 760B generates an addition result or a subtraction result. The SUB signals control whether the adders 760A and 760B generate addition or subtraction results. The LOAD signals control whether the adders 760A-760B add the input value to the accumulated value or ignore the accumulated value and merely load the input value, providing the input value as the output and setting the accumulator value to the input value. The DEL signals have a delay of 0-4 cycles.

The bypass multiplexer selects either the result generated by the adder 760B or the result of the multiplexer 750B. Thus, bypass multiplexer 770 provides either an addition result from the portion 700 or either result from FIG. 6. The multiplexer 780 selects either the output of the multiplexer 770 or the output of the adder 760A and provides the result to the stage 4 delay register 790.

Figure 8:
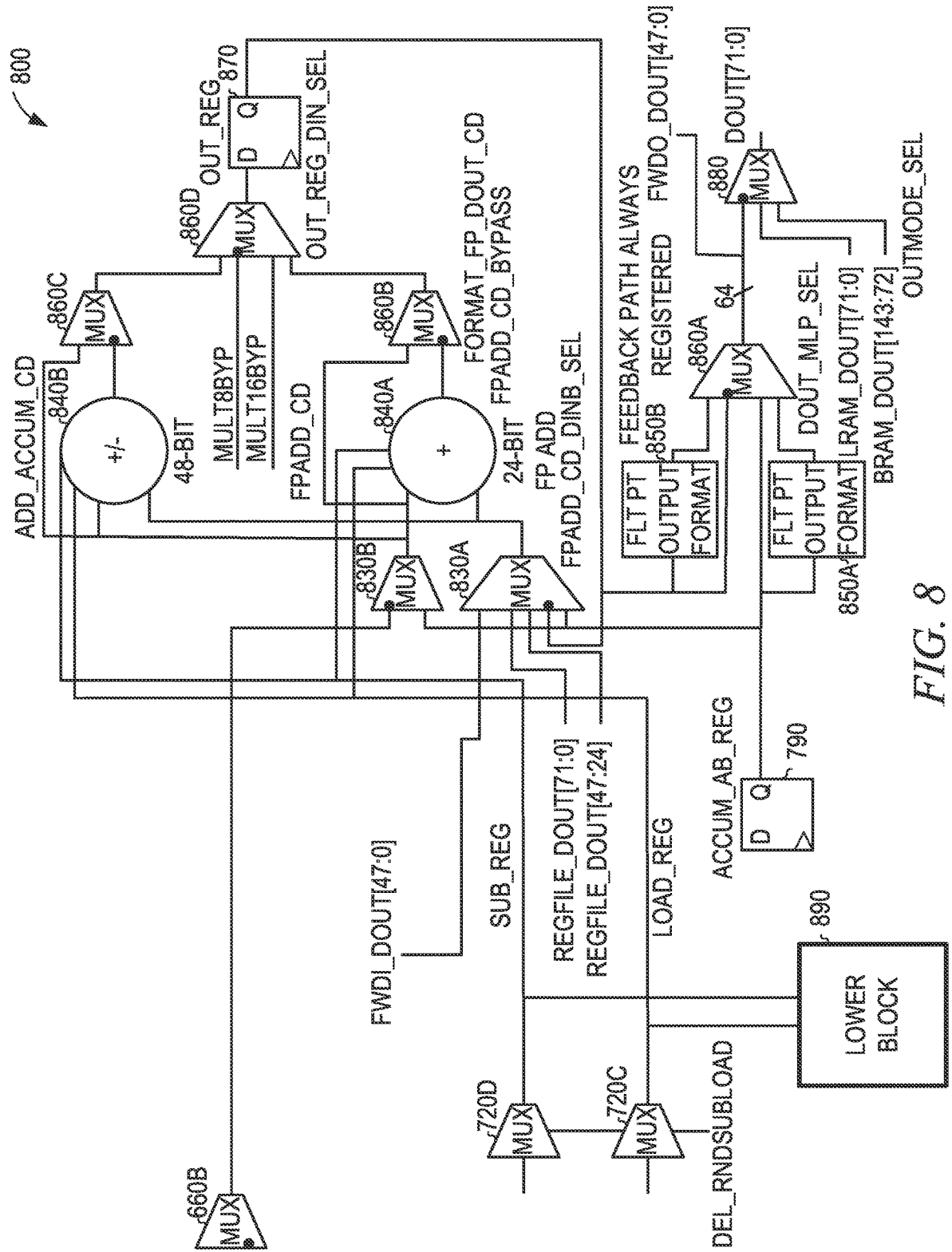
FIG. 8 is a diagrammatic view of a portion of a multiple mode arithmetic circuit, according to some example embodiments.

FIG. 8 is a diagrammatic view of a portion 800 of a multiple mode arithmetic circuit, according to some example embodiments. The portion 800 corresponds to the upper block 795 shown in FIG. 7. The portion 800 includes the multiplexer 660B of FIG. 6; the multiplexers 720C and 720D of FIG. 7; adders 840A and 840B; the stage 4 delay register 790; multiplexers 830A, 830B, 860A, 860B, 860C, 860D, and 880; logic blocks 850A and 850B; and output register 870. The portion 700 of FIG. 7 is represented in FIG. 8 as lower block 890.

The multiplexer 830A selects a value from FWDI_DOUT[47:0]; REGFILE_DOUT[71:0]; REGFILE_DOUT[47:24], 24 bits from the LRAM 125; and value from the output register 870, received via a feedback path. The multiplexer 830B selects either the value from the multiplexer 660B or the value from the stage 4 delay register 790.

The adder 840A sums the outputs from the multiplexers 830A and 830B, as modified by the SUB_REG and LOAD_REG signals. The SUB signals control whether the adder 840A generates addition or subtraction results. The LOAD signals control whether the adder 840A adds the input value to the accumulated value or ignores the accumulated value and merely loads the input value, providing the input value as the output and setting the accumulator value to the input value. As SUB_REG and LOAD_REG are not DEL signals, there is no delay in handling the inputs. The adder 840B adds the outputs from the multiplexers 830A-830B or takes the difference, depending on the SUB_REG signal. The multiplexers 860B and 860C select either the outputs of the adders 840A-840B or, based on an FPADD_CD_BYPASS signal, provide the output from the multiplexer 830B. The multiplexer 860D selects an output from the multiplexer 860B, the multiplexer 860C, a MULT8BYP input, and a MULT16BYP input. If a bypass signal is used, the MULT8BYP signal is selected when the circuit is configured to perform 8-bit operations, and the MULT16BYP signal is selected when the circuit is configured to perform 16-bit operations.

The output of the multiplexer 860D is stored in the output register 870. If the circuit is configured to perform a floating-point format conversion (e.g., from an internal 24-bit floating-point format to a 16-bit output floating-point format), the value in the output register 870 is processed by the logic block 850B before being provided as an input to the multiplexer 860A. Likewise, if the circuit is configured to perform the floating-point format conversion, the value in the stage 4 delay register 790 is processed by the logic block 850A. The multiplexer 860A selects an input from the processed and unprocessed values of the registers 790 and 870. The output of the multiplexer 860A is provided as FWDO_DOUT[47:0], a 48-bit operand cascade output.

In a floating-point mode that differs from the floating-point format used by the portions 500-700, the logics 850A-850B convert the intermediate outputs to a format expected by the FPGA. In an example, the portions 500-700 operates on floating-point values with 16-bit mantissas and 8-bit exponents. In this example, the multiple mode arithmetic circuit supports inputs and outputs using various combinations of 16-bit mantissas, 10-bit mantissas, 12-bit mantissas, 8-bit exponents, 6-bit exponents, and 5-bit exponents. Based on the output format and the format operated on the portions 500-700, the logics 850A-850B convert the output values. In some example embodiments, the internal floating-point format used by the portions 500-700 has a mantissa size at least as large as the mantissa size of the input/output floating-point format.

Integer accumulators can be used for floating-point operations in special cases. In embodiments with both integer and floating-point accumulators, the integer accumulator may be wider than the floating-point accumulator, allowing block floating-point operations to use the integer accumulator without loss of data when the floating-point exponents are close in value.

The multiplexer 880 selects, based on an OUTPUT_SEL signal, the output value for the circuit from the output of the multiplexer 860A; LRAM_DOUT[71:0], a 72-bit value read from the LRAM 125; and BRAM_DOUT[143:72]. The selected output value is provided as DOUT[71:0], a 72-bit output provided to the routing fabric 105.

By way of example and not limitation, the multiple mode arithmetic circuit of FIGS. 5-8 provide a row multiplication result via the multiplexer 880. In matrix multiplication, each number in a row of the first operand is multiplied by each number in a column of the second operand and the sum of the results is stored as an element in the result matrix. This process is repeated for each row of the first operand and each column of the second operand, but the individual multiplication results are discarded. By using a multiple mode arithmetic circuit, row multiplication operands can be performed on matrices using different number formats without relying on a general-purpose processor.

FIG. 9 is a table 900 showing operand types and inputs for four operands of a multiple mode arithmetic circuit, according to some example embodiments. The MODEA column indicates the five-bit mode input value for selection of the A operands for a multiple mode arithmetic circuit that performs operations on A operands and B operands. The OPERAND TYPES column indicates the type of operands used in the selected mode. The remaining four columns indicate the source of each eight-bit portion of the A operands.

Regarding the OPERAND TYPES of FIGS. 9-16, INT8 indicates that the operands are 8-bit integers; INT7 indicates that the operands are 7-bit integers; INT6 indicates that the operands are 6-bit integers; INT16 indicates that the operands are 16-bit integers; BFP8 indicates that the operands are 8-bit block floating-point numbers; BFP7 indicates that the operands are 7-bit block floating-point numbers; BFP6 indicates that the operands are 6-bit block floating-point numbers; BFP6_EXPB indicates that the operands are 6-bit block floating-point numbers with an exponent stored in a register; BFLOAT16 indicates that the operands are 16-bit floating-point numbers in the bfloat format, with one sign bit, eight exponent bits, and seven fraction bits; FLOAT16 indicates that the operands are 16-bit floating-point numbers in the half-precision floating-point format, with one sign bit, five exponent bits, and ten fraction bits; and FLOAT24 indicates that the operands are 24-bit floating-point numbers with one sign bit, eight exponent bits, and fifteen fraction bits.

Regarding the REG columns of FIGS. 9-16, DIN indicates that the data is received via the stage 1 delay registers 440 of FIG. 4. Accordingly, DIN may reflect data received via the switch fabric of the FPGA, data received from intra-tile communications within the tile of the FPGA, data received from the operand cascade input, or any suitable combination thereof. The range within brackets after the name of a source or register indicates the range of bits. For example, DIN[7:0] refers to bits 0-7 from DIN. As another example, DIN[15:8] refers to bits 8-15 from DIN. In addition to inputs from DIN, FIG. 9 (and FIGS. 10-16) include explicit binary values, indicated as a number, a bit symbol, and a value for the number of bits. For example, 8'B0 refers to eight zero bits and 1'B1 refers to a single one bit. 8'B10000000 refers to the specific sequence of eight bits. An empty entry indicates that the eight bits of operand A for the column are not used in the mode of the row.

FIG. 10 is a table 1000 showing operand types and inputs for four operands of the multiple mode arithmetic circuit, according to some example embodiments. The MODEA and OPERAND TYPES columns correspond to the columns of the same names in FIG. 9. The remaining four columns indicate the source of four more eight-bit portion of the A operands, using the same notation described above with respect to FIG. 9.

FIG. 11 is a table 1100 showing operand types and inputs for four operands of the multiple mode arithmetic circuit, according to some example embodiments. The MODEA and OPERAND TYPES columns correspond to the columns of the same names in FIGS. 9-10. The remaining four columns indicate the source of four more eight-bit portion of the A operands, using the same notation described above with respect to FIG. 9.

FIG. 12 is a table 1200 showing operand types and inputs for four operands of the multiple mode arithmetic circuit, according to some example embodiments. The MODEA and OPERAND TYPES columns correspond to the columns of the same names in FIGS. 9-11. The remaining four columns indicate the source of four more eight-bit portion of the A operands, using the same notation described above with respect to FIG. 9.

FIG. 13 is a table 1300 showing operand types and inputs for four operands of the multiple mode arithmetic circuit, according to some example embodiments. The MODEB column indicates the five-bit mode input value for selection of the B operands for the multiple mode arithmetic circuit. The OPERAND TYPES column contains values with the same meaning as described above with respect to FIG. 9. Each column indicates the source of data used for four B operands.

FIG. 14 is a table 1400 showing operand types and inputs for four operands of the multiple mode arithmetic circuit, according to some example embodiments. The MODEB and OPERAND TYPES columns correspond to the columns of the same names in FIG. 13. The remaining four columns indicate the source of four more eight-bit portion of the B operands, using the same notation described above with respect to FIG. 9.

FIG. 15 is a table 1500 showing operand types and inputs for four operands of the multiple mode arithmetic circuit, according to some example embodiments. The MODEB and OPERAND TYPES columns correspond to the columns of the same names in FIGS. 13-14. The remaining four columns indicate the source of four more eight-bit portion of the B operands, using the same notation described above with respect to FIG. 9.

FIG. 16 is a table 1600 showing operand types and inputs for four operands of the multiple mode arithmetic circuit, according to some example embodiments. The MODEB and OPERAND TYPES columns correspond to the columns of the same names in FIGS. 13-15. The remaining four columns indicate the source of four more eight-bit portion of the B operands, using the same notation described above with respect to FIG. 9.

Figure 17:
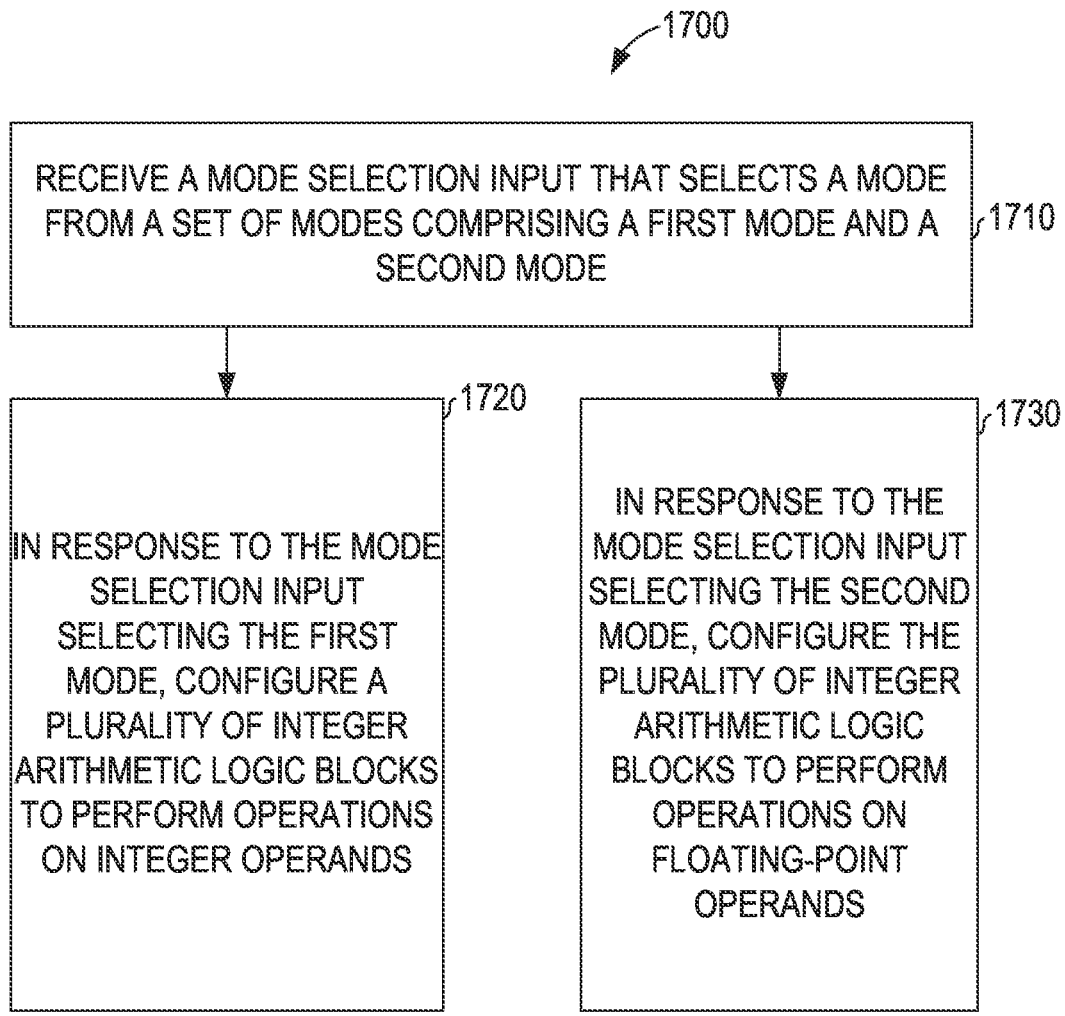
FIG. 17 is a flowchart illustrating operations of a method performed by a multiple mode arithmetic circuit, according to various embodiments of the invention.

FIG. 17 is a flowchart illustrating operations of a method 1700 performed by a multiple mode arithmetic circuit, according to various embodiments of the invention. The method 1700 includes operations 1710, 1720, and 1730. By way of example and not limitation, the method 1700 is described as being performed by the circuits of FIGS. 1-8.

In operation 1710, the multiple mode arithmetic circuit receives a mode selection inputs that selects a mode from a set of modes comprising a first mode and a second mode. As an example, the MODESEL signal shown in FIG. 5 is received. Depending on the value of the mode selection signal, either operation 1720 or operation 1730 is performed.

In response to the mode selection input selecting the first mode, the multiple mode arithmetic circuit, in operation 1720, configures a plurality of integer arithmetic logic blocks to perform operations on integer operands. For example, a MODEA signal and a MODEB signal may be received, causing configuration of the arithmetic circuit in accordance with the tables of FIGS. 9-16 in operation 1720. Thus, in this example embodiment, the first mode is an integer mode.

In response to the mode selection input selecting the second mode, the multiple mode arithmetic circuit configures the plurality of integer arithmetic logic blocks to perform operations on floating-point operands, in operation 1730. For example, a second MODEA signal and a second MODEB signal may be received, causing configuration of the arithmetic circuit in accordance with the tables of FIGS. 9-16 in operation 1720.

Thus, by virtue of the method 1700, the same set of integer arithmetic logic blocks are used to perform either integer or floating-point operations. As a result, the multiple mode arithmetic circuit can be used in systems performing integer operations, floating-point operations, or both, resulting in increased versatility by comparison to existing FPGA tiles that perform arithmetic operations in a single mode while retaining the advantages of arithmetic FPGA tiles over general-purpose processors.

In some example embodiments, other components of the circuit are used in both modes. In the example embodiment of FIG. 4, the bit remap logics 430A-430D remap the inputs for use in both the first mode and the second mode. In the example embodiment of FIG. 5, the registers 510A-510P are used to store input values to the multipliers 520A-520H and the multiplexers 540A-540D select input values to the adders 550A-550B in both the first mode and the second mode.

Additional modes may also be supported. For example, the second mode may be a floating-point mode that operates on floating-point numbers with arbitrary exponent values and a third mode may be a block floating-point mode that operates on floating-point numbers with exponents that differ by no more than a predetermined threshold (e.g., 4).

Figure 18:
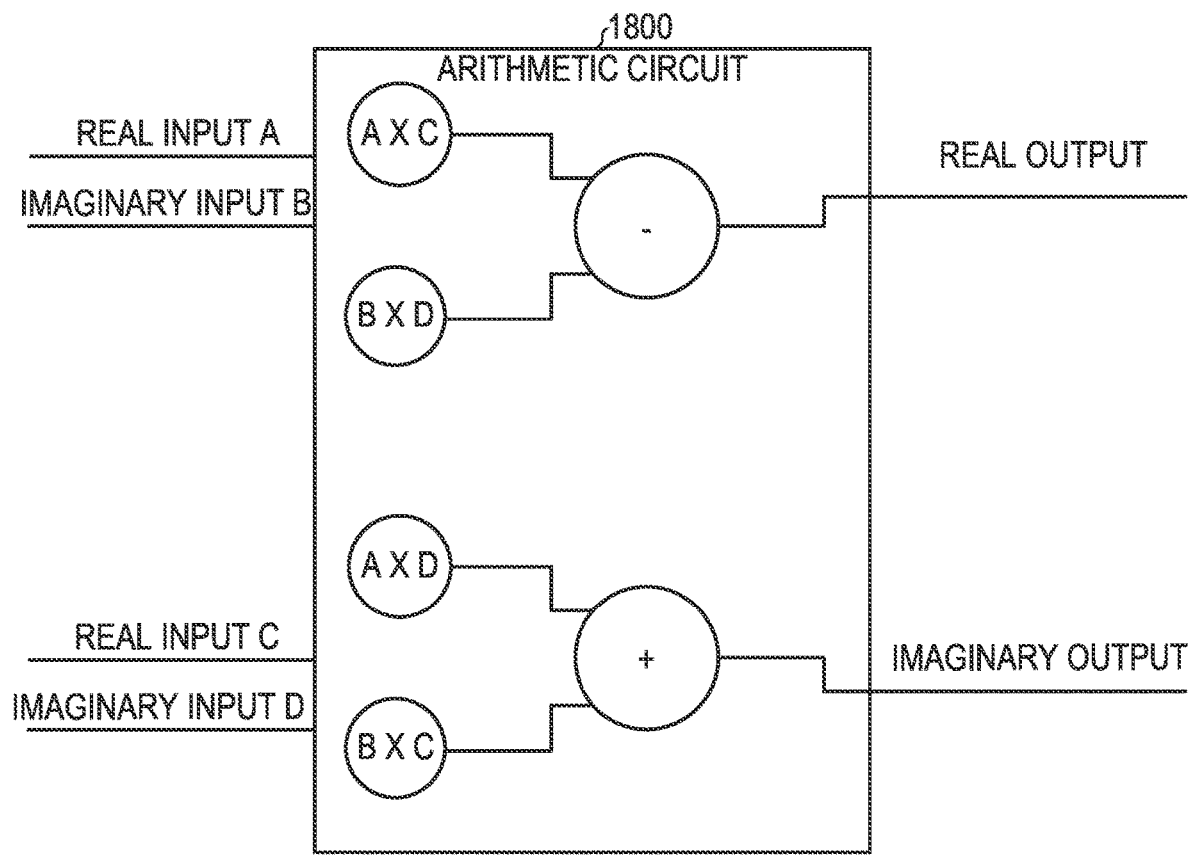
FIG. 18 is a high-level diagrammatic view of a multiple mode arithmetic circuit, according to some example embodiments.

FIG. 18 is a high-level diagrammatic view of a multiple mode arithmetic circuit 1800, according to some example embodiments. In some example embodiments, the arithmetic circuit 1800 is the MLP 115. The arithmetic circuit 1800 receives intra-tile inputs from the memory portion of the FPGA tile, routing fabric inputs from a routing fabric of the FPGA, control signals from the routing fabric of the FPGA, and operand cascade inputs from another FPGA tile without making use of the routing fabric. In various example embodiments, more or fewer inputs are present.

The inputs comprise two complex numbers, A+jB and C+jD. The output is a complex number, wherein the real component is AC−BD and the imaginary component is AD+BC. This functionality is implemented using the circuits of FIGS. 4-8, with the inputs being selected from any combination of routing fabric inputs, intra-tile inputs, and operand cascade inputs and the outputs being provided to any combination of routing fabric outputs, intra-tile outputs, and operand cascade outputs.

As discussed with respect to FIG. 5, four multipliers may be used to provide a single multiplier handling operands of twice the width. Thus, four 8-bit multipliers may be used to provide a single 16-bit multiplier, four 4-bit multipliers may be used to provide a single 8-bit multiplier, and four 16-bit multipliers may be used to provide a single 32-bit multiplier. Since the disclosed circuits provide this quadruple multiplier functionality, the structure of FIG. 18 makes use of the four multipliers to provide complex multiplication functionality at the original width without requiring additional hardware. Thus, the same circuit may implement either 32-bit multiplication or 16-bit complex multiplication; 16-bit multiplication or 8-bit complex multiplication; 8-bit multiplication or 4-bit complex multiplication; and so on.

Figure 19:
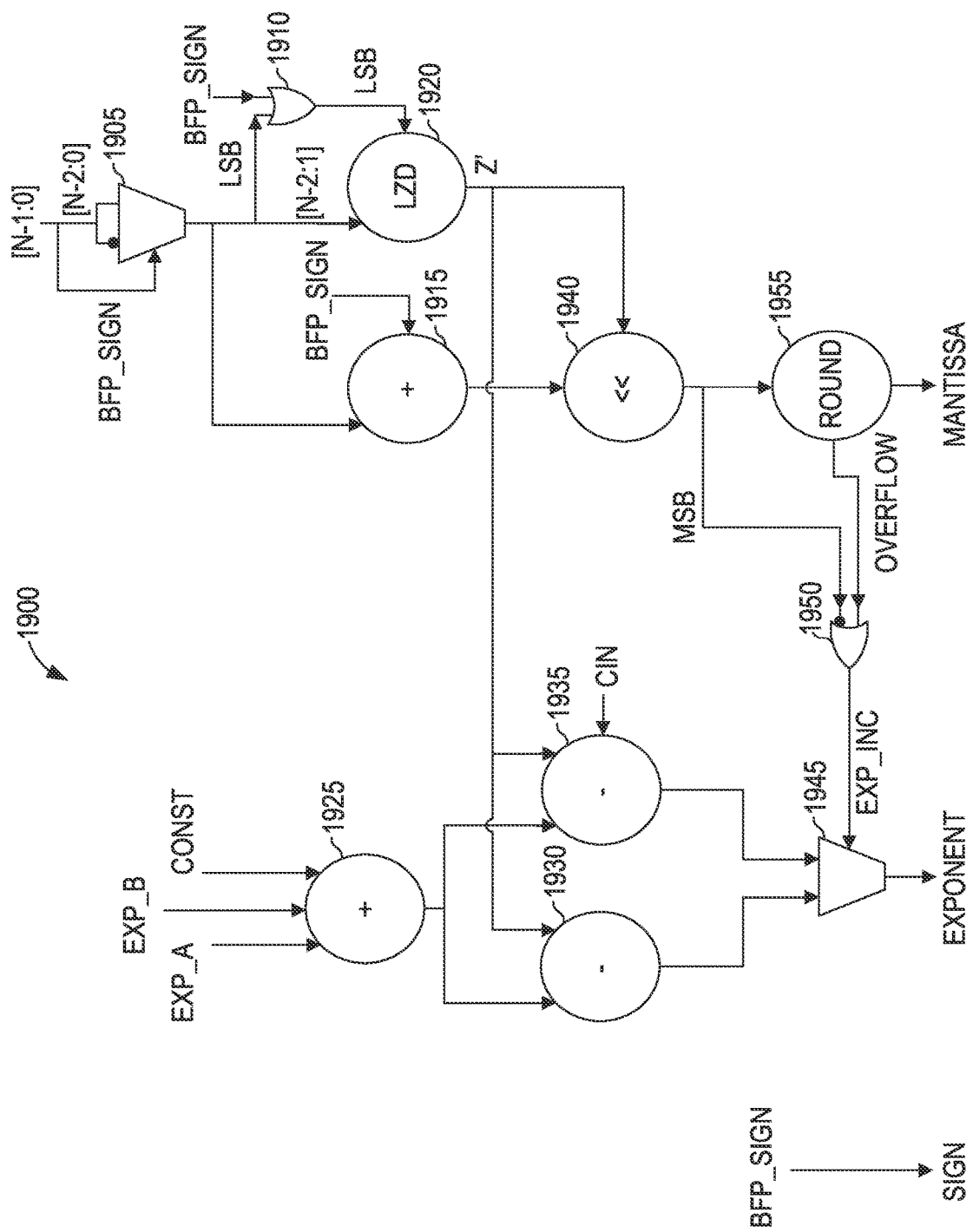
FIG. 19 is a diagrammatic view of a reduced-delay circuit for converting a fixed point value to a block floating point value, according to some example embodiments.

FIG. 19 is a diagrammatic view of a reduced-delay circuit 1900 for converting a fixed point value to a block floating point value, according to some example embodiments. The reduced-delay circuit 1900 includes multiplexers 1905 and 1945; OR gates 1910 and 1950; adders 1915 and 1925; a leading zero detector (LZD) 1920; subtractors 1930 and 1935; a shifter 1940; and a rounder 1955. Data flows from the top of the circuit 1900 to the bottom. Thus, multiple operations are performed in parallel, reducing delay when compared with prior art circuits that generate the result using sequential operations.

The inputs to the circuit 1900 are the exponents of the two floating-point numbers being multiplied, EXP_A and EXP_B, and the N-bit result of the multiplication of the mantissas of the two floating point numbers, [N-1:0]. The adder 1925 determines the sum of EXP_A, EXP_B, and CONST, wherein CONST is defined by:

$$CONST = N-2-d-2\times bias_{in}+bias_{out}+1.$$

In this equation, N is the number of bits of the multiplication result, d is the number of fraction bits in the output floating-point value, $bias_{in}$ is the input bias on the exponent, and $bias_{out}$ is the output bias on the exponent. In some example embodiments, $bias_{in}$ is 15 or 127 and $bias_{out}$ is 127. The first five terms define the ordinary value of CONST. The final +1 is used in conjunction with the subtractors 1930 and 1935 to provide two parallel calculations of the exponent.

The multiplexer 1905 inverts the low N-1 bits of the multiplication result if the highest bit (represented as BFP_SIGN) is 1, indicating that the result is a negative number. Otherwise, the sign bit is removed and the low N-1 bits are output from the multiplexer 1905. This effectively converts the input two's complement value to a signed-magnitude format.

The least significant bit (N[0:0]) and BFP_SIGN are input to the OR gate 1910. The output replaces the least significant bit from the multiplexer 1905 and the resulting value is input to the LZD 1920. The LZD 1920 determines the number of leading zeros in the input, and outputs that value as Z'.

The output from the multiplexer 1905 is added, by the adder 1915, to BFP_SIGN. The addition result from the adder 1915 is shifted left Z' bits by the shifter 1940. The most significant bit (MSB) of the result will be 1 if Z' was an accurate count of the number of leading zeros. If Z' was an accurate count of the leading zeros, the shifted result will be normalized by having the MSB equal to 1. The shifted result is provided to the rounder 1955, which rounds the result from N-1 bits to P-1 bits, where P is the size of the output mantissa+sign. If the rounding operation had an overflow because the number of significant bits exceeded P-1, RND_OVERFLOW is set.

The subtractors 1930 and 1935 each subtract Z' from the result of the adder 1925. The subtractor 1935 also applies a carry input (CIN) value, set to −1. Thus, two possible exponents are calculated in parallel by the subtractors 1930 and 1935.

The OR gate 1950 controls the multiplexer 1945 and determines whether the exponent should be the output of the subtractor 1930 or the output of the subtractor 1935. If Z' was incorrect, as indicated by the MSB value output from the shifter 1940 being a zero, the exponent should be the output of the subtractor 1935, adjusted by an additional −1, instead of the output of the subtractor 1930, determined by using Z' as the count of leading zeros. Furthermore, if RND_OVERFLOW was set, the exponent should be reduced by one to compensate.

The output from the circuit 1900 is a sign, exponent, and mantissa of the result of the multiplication of the two input floating-point numbers. The output sign is BFP_SIGN; the output exponent is the output of the multiplexer 1945; and the output mantissa is the output of the rounder 1955. By using the circuit 1900 to determine both possible exponents in parallel instead of performing other operations first to ensure that the leading zero count is accurate, the delay is reduced. Though the circuit 1900 is shown as operating on block floating-point values, the LZD 1920, shifter 1940, and paired subtractors 1930 and 1935 would also form the core of a similar circuit to operate on standard floating-point values.

The circuit 1900 may be implemented as a circuit portion of the multiple mode arithmetic circuit 115, to convert an output from the plurality of integer logic blocks to a floating-point number. The conversion comprises determining, by the parallel subtractors 1930 and 1935, two possible exponent values of the floating-point number; determining, by the LZD 1920, an estimated count of leading zeroes in the output; and selecting, by the multiplexer 1945 between the two possible exponent values based on a determination of whether the estimated count of leading zeroes was correct (by the shifter 1940 and multiplexer 1950).

Figure 20:
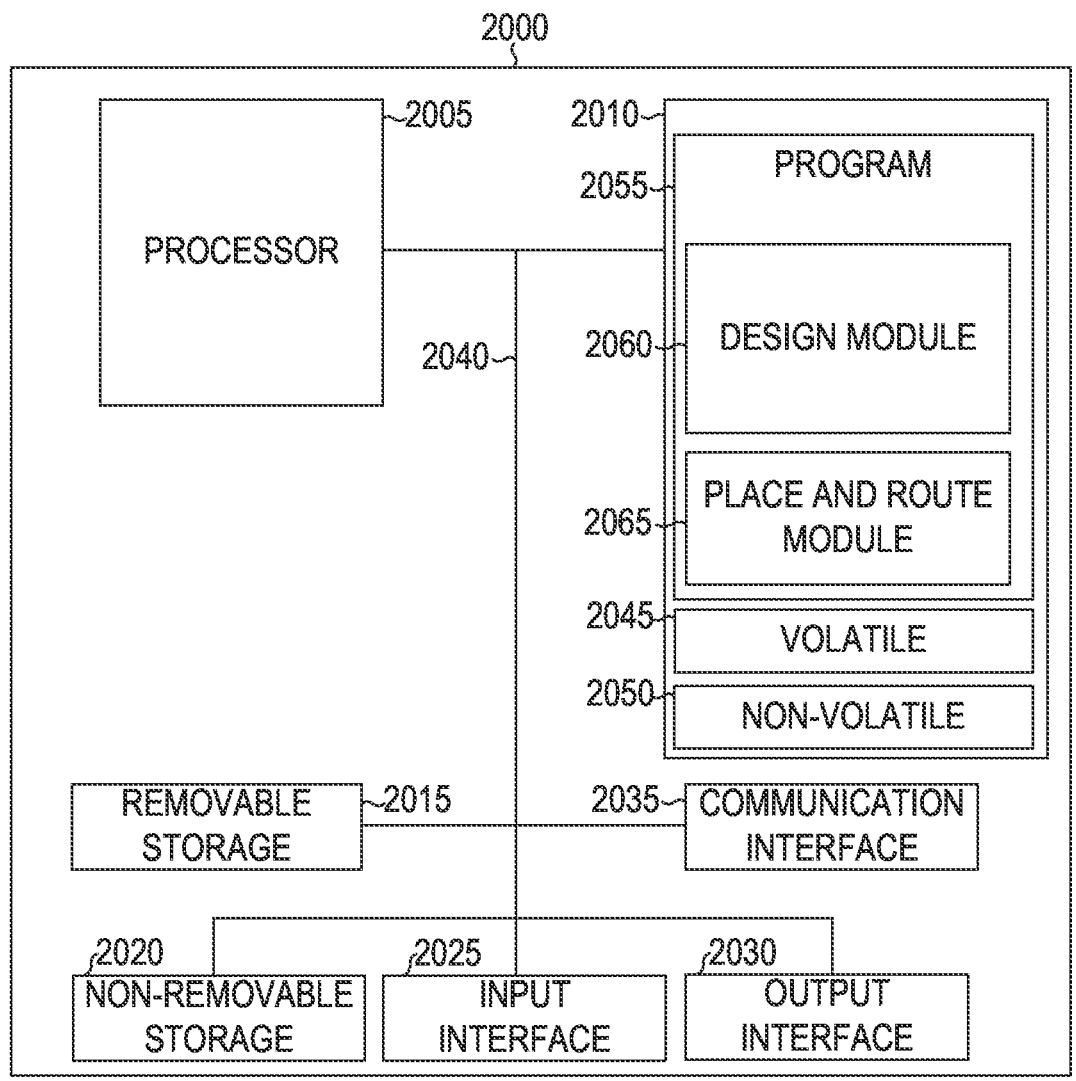
FIG. 20 is a block diagram illustrating components of a system for controlling fabrication of circuits described herein, according to some example embodiments.

FIG. 20 is a block diagram illustrating components of a computer 2000 that programs an FPGA, according to some example embodiments. All components need not be used in various embodiments. For example, clients, servers, autonomous systems, and cloud-based network resources may each use a different set of components, or, in the case of servers, for example, larger storage devices.

One example computing device in the form of a computer 2000 (also referred to as computing device 2000 and computer system 2000) may include a processor 2005, memory storage 2010, removable storage 2015, and non-removable storage 2020, all connected by a bus 2040. Although the example computing device is illustrated and described as the computer 2000, the computing device may be in different forms in different embodiments. For example, the computing device may instead be a smartphone, a tablet, a smartwatch, or another computing device including elements the same as or similar to those illustrated and described with regard to FIG. 20. Devices such as smartphones, tablets, and smartwatches are collectively referred to as "mobile devices." Further, although the various data. storage elements are illustrated as part of the computer 2000, the storage may also or alternatively include cloud-based storage accessible via a network, such as the Internet, or server-based storage.

The memory storage 2010 may include volatile memory 2045 and non-volatile memory 2050 and may store a program 2055. The computer 2000 may include, or have access to, a computing environment that includes a variety of computer-readable media, such as the volatile memory 2045; the non-volatile memory 2050; the removable storage 2015; and the non-removable storage 2020. Computer storage includes random-access memory (RAM), read-only memory (ROM), erasable programmable read-only memory (EPROM) and electrically erasable programmable read-only memory (EPROM), flash memory or other memory technologies, compact disc read-only memory (CD ROM), digital versatile disks (DVD) or other optical disk storage, magnetic cassettes, magnetic tape, magnetic disk storage or other magnetic storage devices, or any other medium capable of storing computer-readable instructions.

The computer 2000 may include or have access to a computing environment that includes an input interface 2025, an output interface 2030, and a communication interface 2035. The output interface 2030 may interface to or include a display device, such as a touchscreen, that also may serve as an input device. The input interface 2025 may interface to or include one or more of a touchscreen, a touchpad, a mouse, a keyboard, a camera, one or more device-specific buttons, one or more sensors integrated within or coupled via wired or wireless data connections to the computer 2000, and other input devices. The computer 2000 may operate in a networked environment using the communication interface 2035 to connect to one or more remote computers, such as database servers. The remote computer may include a personal computer (PC), server, router, network PC, peer device or other common network node, or the like. The communication interface 2035 may connect to a local-area network (LAN), a wide-area network (WAN), a cellular network, a WiFi network, a Bluetooth network, or other networks.

Computer instructions stored on a computer-readable medium (e.g., the program 2055 stored in the memory storage 2010) are executable by the processor 2005 of the computer 2000. A hard drive, CD-ROM, and RAM are some examples of articles including a non-transitory computer-readable medium such as a storage device. The terms "computer-readable medium" and "storage device" do not include carrier waves to the extent that carrier waves are deemed too transitory. "Computer-readable non-transitory media" includes all types of computer-readable media, including magnetic storage media, optical storage media, flash media, and solid-state storage media. It should be understood that software can be installed in and sold with a computer. Alternatively, the software can be obtained and loaded into the computer, including obtaining the software through a physical medium or distribution system, including, for example, from a server owned by the software creator or from a server not owned but used by the software creator. The software can be stored on a server for distribution over the Internet, for example.

The program 2055 is shown as including a design module 2060 and a place and route module 2065. Any one or more of the modules described herein may be implemented using hardware (e.g., a processor of a machine, an ASIC, an FPGA, or any suitable combination thereof). Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The design module 2060 defines a design of a circuit (e.g., a processor, signal processor, compute engine, state machine, or controller circuit). For example, the design module 2060 may provide a user interface to allow a user to design a circuit.

The place and route module 2065 determines the physical layout of the resulting integrated circuit based on the circuit design defined by the design module 2060. For example, a design comprising one or more tiles with fused memory and arithmetic circuits may be laid out by the place and route module 2065 in order to be programmed into the FPGA configuration.

The Abstract of the Disclosure is provided to comply with 37 C.F.R. § 1.72(b), requiring an abstract that allows the reader to quickly ascertain the nature of the technical disclosure. It is submitted with the understanding that it will not be used to interpret or limit the claims. In addition, in the foregoing Detailed Description, it may be seen that various features are grouped together in a single embodiment for the purpose of streamlining the disclosure. This method of disclosure is not to be interpreted as limiting the claims. Thus, the following claims are hereby incorporated into the Detailed Description, with each claim standing on its own as a separate embodiment.

What is claimed is:

1. A circuit comprising:
a mode selection input that selects a mode from a set of modes comprising a first mode, a second mode, and a third mode; and
a plurality of integer arithmetic logic blocks;
wherein:
in the first mode, the plurality of integer arithmetic logic blocks is configured to perform a first number of operations on first integer operands of a first size;
in the second mode, the plurality of integer arithmetic logic blocks is configured to perform operations on floating-point operands; and
in the third mode, the plurality of integer arithmetic logic blocks is configured to perform a second number of operations on second integer operands of a second size, the second size being larger than the first size, the second number of operations being smaller than the first number of operations.

2. The circuit of claim 1, further comprising:
a set of input connections; and
bit remapping circuitry that selectively connects the input connections to the integer arithmetic logic blocks based on the mode selection input, the bit remapping circuitry being operable in both the first mode and the second mode.

3. The circuit of claim 2, further comprising:
interconnection circuitry among the plurality of integer arithmetic logic blocks, the interconnection circuitry comprising a plurality of registers and multiplexers, the registers and multiplexers being operable in both the first mode and the second mode.

4. The circuit of claim 1, wherein, in the second mode:
the floating-point operands comprise a third operand and a fourth operand; and
the plurality of integer arithmetic logic blocks is further configured to shift a mantissa of the fourth operand by a difference between an exponent of the third operand and an exponent of the fourth operand based on a determination that the exponent of the third operand is the greatest exponent among exponents of the floating-point operands.

5. The circuit of claim 1, wherein:
the floating-point operands are first floating-point operands of a first format;
the set of modes further comprises a fourth mode;
in the second mode, the plurality of integer arithmetic logic blocks is further configured to convert the first floating-point operands to a third format; and
in the fourth mode, the plurality of integer arithmetic logic blocks is configured to:
perform operations on second floating-point operands of a second format; and
convert the second floating-point operands to the third format.

6. The circuit of claim 5, wherein the third format comprises a fifteen-bit mantissa, a one-bit sign, and an eight-bit exponent.

7. The circuit of claim 5, wherein:
a mantissa size of the third format is greater than or equal to a mantissa size of the first format;
the mantissa size of the third format is greater than or equal to a mantissa size of the second format; and
the mantissa size of the second format is different from the mantissa size of the first format.

8. The circuit of claim 1, further comprising:
an adder that generates a result that is a sum of partial products.

9. The circuit of claim 1, wherein:
the first size is eight bits;
the second size is sixteen bits; and
the first number of operations is four times the second number of operations.

10. The circuit of claim 1, further comprising:
a plurality of output connections that, in the first mode and the second mode, provide a plurality of partial products, wherein a bit width of each partial product is based on a number of partial products provided.

11. The circuit of claim 1, wherein:
the first integer operands of the first size are eight-bit integers; and
the second integer operands of the second size are sixteen-bit integers.

12. The circuit of claim 1, wherein:
the second size is twice the first size; and
the first number of operations is twice the second number of operations.

13. The circuit of claim 1, further comprising:
a plurality of output connections that, in the first mode and the second mode, provide a plurality of partial products, wherein a bit width of each partial product is based on a number of partial products provided.

14. A non-transitory machine-readable medium containing instructions that, when executed by one or more processors, cause the one or more processors to control configuration of a field programmable gate array (FPGA) comprising:
a mode selection input that selects a mode from a set of modes comprising a first mode, a second mode, and a third mode; and
a plurality of integer arithmetic logic blocks;
wherein:
in the first mode, the plurality of integer arithmetic logic blocks is configured to perform a first number of operations on first integer operands of a first size;
in the second mode, the plurality of integer arithmetic logic blocks is configured to perform operations on floating-point operands; and
in the third mode, the plurality of integer arithmetic logic blocks is configured to perform a second number of operations on second integer operands of a second size, the second size being larger than the first size, the second number of operations being smaller than the first number of operations.

15. The non-transitory machine-readable medium of claim 14, wherein the FPGA further comprises:
a set of input connections; and
bit remapping circuitry that selectively connects the input connections to the integer arithmetic logic blocks based on the mode selection input, the bit remapping circuitry being operable in both the first mode and the second mode.

16. The non-transitory machine-readable medium of claim 15 wherein the FPGA further comprises:
interconnection circuitry among the plurality of integer arithmetic logic blocks, the interconnection circuitry comprising a plurality of registers and multiplexers, the registers and multiplexers being operable in both the first mode and the second mode.

17. The non-transitory machine-readable medium of claim 14, wherein:
the floating-point operands are first floating-point operands of a first format;
the set of modes further comprises a fourth mode;
in the second mode, the plurality of integer arithmetic logic blocks is further configured to convert the first floating-point operands to a third format; and
in the fourth mode, the plurality of integer arithmetic logic blocks is configured to:
perform operations on second floating-point operands of a second format; and
convert the second floating-point operands to the third format.

18. The non-transitory machine-readable medium of claim 17, wherein the third format comprises a fifteen-bit mantissa, a one-bit sign, and an eight-bit exponent.

19. A method comprising:
receiving, by a circuit, a first mode selection input that selects a first mode from a set of modes comprising the first mode, a second mode, and a third mode;
in response to receiving the first mode selection input, configuring a plurality of integer arithmetic logic blocks to perform a first number of operations on first integer operands of a first size;
receiving, by the circuit, a second mode selection input that selects the second mode from the set of modes;
in response to receiving the second mode selection input, configuring the plurality of integer arithmetic logic blocks to perform operations on floating-point operands;
receiving, by the circuit, a third mode selection input that selects the third mode from the set of modes; and
in response to receiving the third mode selection input, configuring the plurality of integer arithmetic logic blocks to perform a second number of operations on second integer operands of a second size, the second size being larger than the first size, the second number of operations being smaller than the first number of operations.

20. The method of claim 19, wherein:
the first integer operands of the first size are eight-bit integers; and
the second integer operands of the second size are sixteen-bit integers.

* * * * *

UNITED STATES PATENT AND TRADEMARK OFFICE
CERTIFICATE OF CORRECTION

PATENT NO. : 11,650,792 B2
APPLICATION NO. : 17/569801
DATED : May 16, 2023
INVENTOR(S) : Pugh et al.

It is certified that error appears in the above-identified patent and that said Letters Patent is hereby corrected as shown below:

In the Specification

In Column 16, Line 45, delete "(EPROM)," and insert --(EEPROM),-- therefor

Signed and Sealed this
Tenth Day of September, 2024

Katherine Kelly Vidal
*Director of the United States Patent and Trademark Office*